US012414084B2

(12) United States Patent
Wu et al.

(10) Patent No.: US 12,414,084 B2
(45) Date of Patent: Sep. 9, 2025

(54) METHOD AND DEVICE IN NODES USED FOR WIRELESS COMMUNICATION

(71) Applicant: BUNKER HILL TECHNOLOGIES LLC, Allen, TX (US)

(72) Inventors: Keying Wu, Shanghai (CN); Xiaobo Zhang, Shanghai (CN)

(73) Assignee: BUNKER HILL TECHNOLOGIES LLC, Allen, TX (US)

( * ) Notice: Subject to any disclaimer, the term of this patent is extended or adjusted under 35 U.S.C. 154(b) by 548 days.

(21) Appl. No.: 17/741,486

(22) Filed: May 11, 2022

(65) Prior Publication Data
US 2022/0272671 A1    Aug. 25, 2022

Related U.S. Application Data

(63) Continuation of application No. PCT/CN2020/121380, filed on Oct. 16, 2020.

(30) Foreign Application Priority Data

Nov. 14, 2019 (CN) .......................... 201911115436.4

(51) Int. Cl.
H04W 72/02 (2009.01)
H04W 72/0446 (2023.01)
(Continued)

(52) U.S. Cl.
CPC ....... *H04W 72/02* (2013.01); *H04W 72/0446* (2013.01); *H04W 72/0453* (2013.01); *H04W 72/1263* (2013.01)

(58) Field of Classification Search
CPC ............. H04W 72/02; H04W 72/0446; H04W 72/0453; H04W 72/1263
See application file for complete search history.

(56) References Cited

U.S. PATENT DOCUMENTS 10,785,753 B1 *   9/2020   Li .................... H04L 5/0044
11,805,486 B2 * 10/2023   Ryu .................. H04W 52/241
(Continued)

FOREIGN PATENT DOCUMENTS

CN    102026377 A    4/2011
CN    108023622 A    5/2018
(Continued)

OTHER PUBLICATIONS

ISR received in application No. PCT/CN2020/121380 dated Jan. 7, 2021.
(Continued)

Primary Examiner — Shean Tokuta
(74) Attorney, Agent, or Firm — Ascenda Law Group, PC

(57) ABSTRACT

The present disclosure provides a method and a device in a node used for wireless communications. A first node receives a first signaling and a first signal in a first time-frequency resource block; and transmits a second information block in a first radio resource block. The first signaling comprises scheduling information for the first signal; the first signal carries a first bit block set; the second information block indicates whether the first bit block set is correctly received; the first radio resource block belongs to a first radio resource block group; the first time-frequency resource block is used to determine a first time-frequency unit. The above method realizes HARQ-ACK multiplexing in the sidelink, thus improving the resource utilization ratio on the feedback channel and streamlining the design of the feedback channel.

15 Claims, 7 Drawing Sheets

(51) Int. Cl.
*H04W 72/0453* (2023.01)
*H04W 72/1263* (2023.01)

(56) References Cited

U.S. PATENT DOCUMENTS

| | | | |
|---|---|---|---|
| 11,832,217 B2 * | 11/2023 | Wu | H04L 5/0055 |
| 2014/0321422 A1 * | 10/2014 | Choi | H04L 5/0055 |
| | | | 370/330 |
| 2019/0319762 A1 * | 10/2019 | Zhang | H04L 5/0051 |
| 2020/0145138 A1 * | 5/2020 | Bhattad | H04L 1/1614 |
| 2020/0275425 A1 * | 8/2020 | Cao | H04L 1/0003 |
| 2020/0336253 A1 * | 10/2020 | He | H04W 76/11 |
| 2020/0344722 A1 * | 10/2020 | He | H04W 72/02 |
| 2020/0351033 A1 * | 11/2020 | Ryu | H04L 1/1861 |
| 2020/0389257 A1 * | 12/2020 | Kung | H04W 4/06 |
| 2020/0396040 A1 * | 12/2020 | Miao | H04W 4/40 |
| 2020/0413348 A1 * | 12/2020 | Ryu | H04W 52/241 |
| 2021/0028910 A1 * | 1/2021 | Cheng | H04L 5/0064 |
| 2021/0099975 A1 * | 4/2021 | Wu | H04L 1/1819 |
| 2021/0112544 A1 * | 4/2021 | Chen | H04W 52/242 |
| 2021/0144691 A1 * | 5/2021 | Balasubramanian | |
| | | | H04L 1/1861 |
| 2021/0218539 A1 * | 7/2021 | Hu | H04L 1/1861 |
| 2021/0314109 A1 * | 10/2021 | Zhao | H04W 72/0446 |
| 2022/0248414 A1 * | 8/2022 | Deng | H04L 5/0094 |
| 2022/0272671 A1 * | 8/2022 | Wu | H04W 72/02 |
| 2022/0376834 A1 * | 11/2022 | Hahn | H04L 1/1812 |
| 2023/0179376 A1 * | 6/2023 | Wu | H04W 24/02 |
| | | | 370/329 |

FOREIGN PATENT DOCUMENTS

| | | | | |
|---|---|---|---|---|
| CN | 108111266 A | | 6/2018 | |
| CN | 109075921 A | * | 12/2018 | H04L 1/1812 |
| CN | 109792326 A | | 5/2019 | |
| CN | 109792369 A | | 5/2019 | |
| CN | 109937586 A | | 6/2019 | |
| CN | 110012540 A | | 7/2019 | |
| CN | 111436120 A | * | 7/2020 | H04B 7/0478 |
| CN | 111436130 A | * | 7/2020 | H04L 1/1607 |
| CN | 108631968 B | * | 2/2021 | H04L 5/0055 |
| CN | 112713973 A | * | 4/2021 | H04L 5/003 |
| CN | 112751656 A | * | 5/2021 | H04L 5/0055 |
| CN | 112804038 A | * | 5/2021 | H04L 1/1812 |
| ES | 2953015 T3 | * | 11/2023 | H04L 1/1812 |
| WO | WO-2013018612 A1 | * | 2/2013 | H04B 7/0452 |
| WO | WO-2013048070 A1 | * | 4/2013 | H04L 1/1861 |
| WO | WO-2014173351 A1 | * | 10/2014 | H04L 1/1671 |
| WO | WO-2018054381 A1 | * | 3/2018 | H04L 1/16 |
| WO | WO-2020033623 A1 | * | 2/2020 | H04L 1/1614 |
| WO | WO-2020063301 A1 | * | 4/2020 | H04L 1/1812 |
| WO | WO-2020210333 A1 | * | 10/2020 | H04L 1/1812 |
| WO | WO-2021062780 A1 | | 4/2021 | |
| WO | WO-2021067912 A1 | * | 4/2021 | H04L 1/1812 |
| WO | WO-2021093512 A1 | * | 5/2021 | H04L 1/1812 |
| WO | WO-2021133238 A1 | * | 7/2021 | H04L 1/1812 |

OTHER PUBLICATIONS

First Office Action of Chinses patent application No. CN201911115436.4 dated Apr. 29, 2022.
Supplementary Search Report of Chinses patent application No. CN201911115436.4 dated Oct. 17, 2022.
Notification to Grant Patent Right for Invention of Chinses patent application No. CN201911115436.4 dated Oct. 28, 2022.
First Search Report of Chinses patent application No. CN201911115436.4 dated Apr. 25, 2022.
CATT Sidelink physical layer procedures in NR V2X 3GPP TSG RAN WG1 Meeting #99 R1-1912159 Nov. 9, 2019.
OPPO Physical layer procedure for NR-V2X sidelink 3GPP TSG RAN WG1 #98bis R1-1910375 Oct. 9, 2019.
Panasonic Discussion on physical layer procedures for sidelink in NR V2X 3GPP TSG RAN WG1 #98bis R1-1910843 Oct. 7, 2019.

* cited by examiner

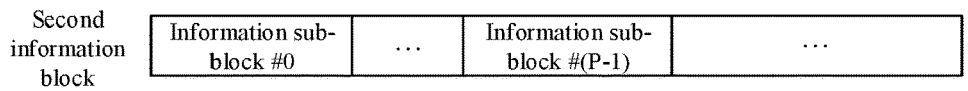
FIG. 11
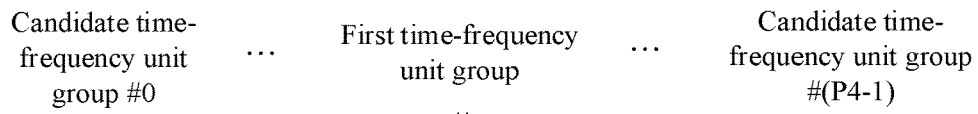
FIG. 12
FIG. 13
(first combination, first sub-channel) —used to determine→ First radio resource block group
FIG. 14
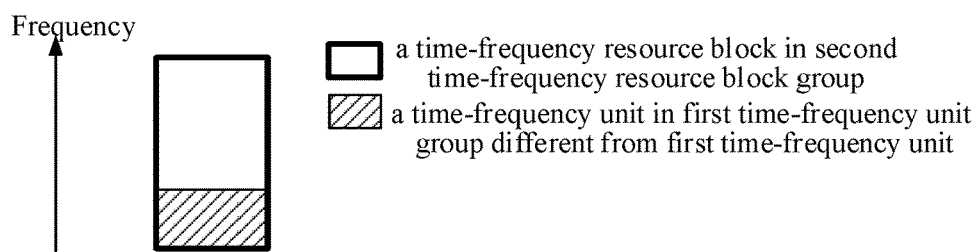
FIG. 15
Any time unit in first time unit set ←associated with→ Target time unit
FIG. 16
Frequency
☐ a time-frequency resource block in second time-frequency resource block group
▨ a time-frequency unit in first time-frequency unit group different from first time-frequency unit
→ Time
FIG. 17

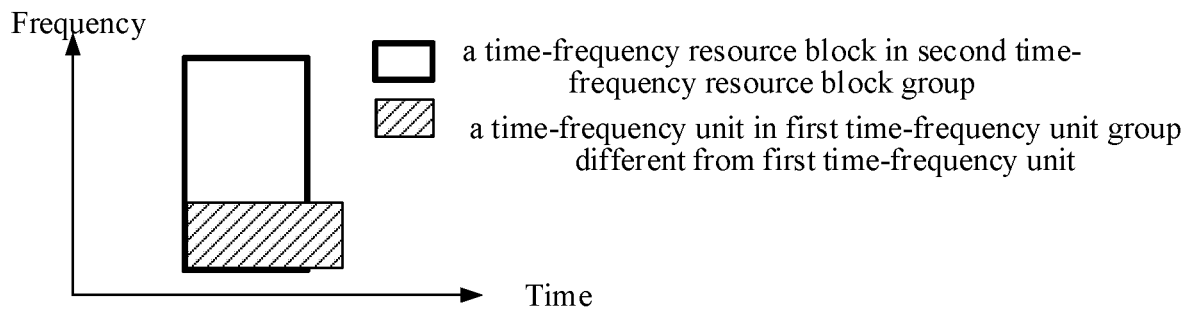
FIG. 18
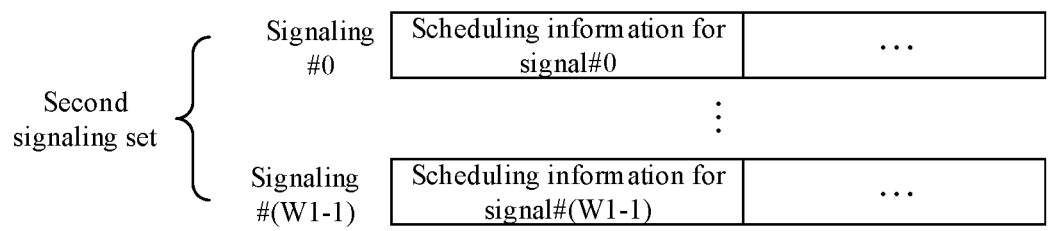
FIG. 19
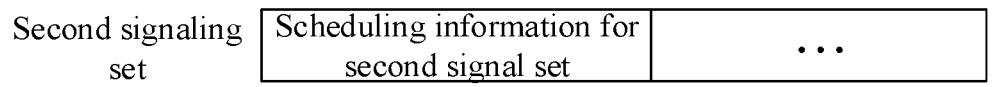
FIG. 20
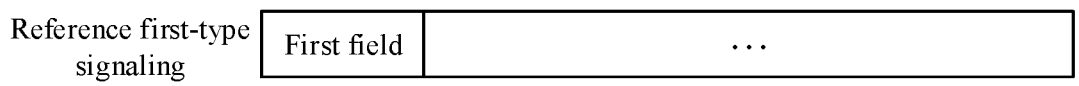
FIG. 21
First information block —indicating→ First time-frequency resource pool
FIG. 22
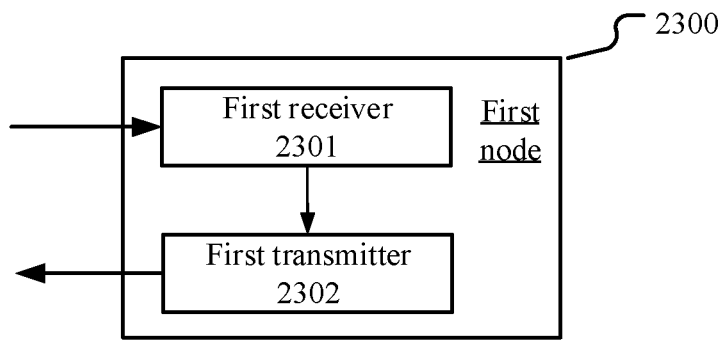
FIG. 23

METHOD AND DEVICE IN NODES USED FOR WIRELESS COMMUNICATION

CROSS REFERENCE TO RELATED APPLICATIONS

This application is the continuation of International Patent Application No. PCT/CN2020/121380, filed on Oct. 16, 2020, which claims the priority benefit of Chinese Patent Application No. 201911115436.4, filed on Nov. 14, 2019, the full disclosure of which is incorporated herein by reference.

BACKGROUND

Technical Field

The present disclosure relates to transmission methods and devices in wireless communication systems, and in particular to a method and a device of sidelink-related transmission in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP embarked on its work of standards setting and studies around the NR framework. At present, the 3GPP has finished regulations of requirements targeting the 5G V2X traffics which are included in the TS 22.886. The 3GPP has defined 4 major Use Case Groups for 5G V2X services: Vehicles Platooning, Extended Sensors, Advanced Driving and Remote Driving. The study on V2X techniques based on NR has been initiated at the 3GPP RAN #80 Plenary.

SUMMARY

NR V2X is notably featured by supporting both unicast and groupcast and the functionality of Hybrid Automatic Repeat reQuest (HARQ) in comparison with the existing Long-term Evolution (LIE) V2X system. The Physical Sidelink Feedback Channel (PSFCH) is introduced to be used for a HARQ-Acknowledgement (HARQ-ACK) transmission in the sidelink. As a conclusion reached at the 3GPP RANI #96b session, PSFCH resources in a sidelink resource pool will be configured periodically or pre-configured. As a conclusion reached at the 3GPP RANI #97 session, slots and sub-channels occupied by a Physical Sidelink Shared Channel (PSSCH) will be used to determine a corresponding PSFCH resource.

Inventors find through researches that when multiple PSFCHs targeting a same node conflict with each other in time domain, a transmitting node for PSFCHs can multiplex contents in different PSFCHs onto a same PSFCH, thus preventing the lack of HARQ-ACK information and resource wastes that results therefrom. The design of PSFCH multiplexing mechanism is an issue that remains to be addressed.

To address the above problem, the present disclosure provides a solution. It should be noted that though the present disclosure only took the sidelink communications as a typical or exemplary scenario in the statement above, it is also applicable to other scenarios of cellular communications, where similar technical effects to those in sidelink communications can be achieved. Additionally, the adoption of a unified solution for various scenarios, including but not limited to sidelink communications and cellular communications, contributes to the reduction of hardcore complexity and costs. In the case of no conflict, the embodiments of a first node and the characteristics in the embodiments may be applied to a second node, and vice versa. What's more, the embodiments in the present disclosure and the characteristics in the embodiments can be arbitrarily combined if there is no conflict.

The present disclosure provides a method in a first node for wireless communications, comprising:
  receiving a first signaling and a first signal in a first time-frequency resource block; and
  transmitting a second information block in a first radio resource block;
  herein, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, a problem to be solved in the present disclosure includes: how to determine resources for a feedback channel when HARQ-ACK information for multiple data channels are multiplexed onto the feedback channel. The method provided above addresses the problem by establishing a correspondence relationship between a time-frequency resource combination occupied by a data channel corresponding to multiplexed HARQ-ACK information and a corresponding feedback channel.

In one embodiment, characteristics of the above method include: there are HARQ-ACKs corresponding to multiple PSSCHs being multiplexed on the first radio resource block, the first time-frequency unit group reflecting a combination of time-frequency resources occupied by the multiple PSSCHs.

In one embodiment, the above method is advantageous in realizing the HARQ-ACK multiplexing in sidelink communications, improving the resource utilization ratio for a feedback channel, and streamlining the design of the feedback channel.

In one embodiment, the above method is advantageous in avoiding wastes of resources for a PSFCH.

According to one aspect of the present disclosure, characterized in that the first time-frequency unit group is a candidate time-frequency unit group of K1 candidate time-frequency unit groups, K1 being a positive integer greater than 1, any candidate time-frequency unit group among the K1 candidate time-frequency unit groups comprises the first time-frequency unit.

According to one aspect of the present disclosure, characterized in that the first signaling indicates the first time-frequency unit group out of the K1 candidate time-frequency unit groups.

In one embodiment, the above method is advantageous in avoiding blind detections on the second information block performed by a transmitter for the first signal.

According to one aspect of the present disclosure, characterized in that any time-frequency unit in the first time-frequency unit group belongs to a time unit in a first time unit set in time domain, the first time unit set comprises a positive integer number of time unit(s); the first radio resource block group belongs to a target time unit in time domain; any time unit in the first time unit set is associated with the target time unit.

According to one aspect of the present disclosure, characterized in comprising:
  receiving a second signaling set and a second signal set in a second time-frequency resource block group;
  herein, the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

According to one aspect of the present disclosure, characterized in that the first signaling is a first-type signaling, the first-type signaling comprising a first field; a reference first-type signaling is any said first-type signaling, and a data channel scheduled by the reference first-type signaling is used to determine a reference time-frequency unit, the first field in the reference first-type signaling indicates whether a radio resource occupied by a second-type channel corresponding to the reference first-type signaling is related to at least one time-frequency unit other than the reference time-frequency unit.

In one embodiment, the above method is advantageous in achieving dynamic shifts between a HARQ-ACK feedback mechanism supporting multiplexing and a HARQ-ACK feedback mechanism not supporting multiplexing, thus enhancing the flexibility and compatibility of the system.

According to one aspect of the present disclosure, characterized in comprising:
  receiving a first information block;
  herein, the first information block indicates a first time-frequency resource pool, the first time-frequency resource block belonging to the first time-frequency resource pool.

According to one aspect of the present disclosure, the first node is a UE.

According to one aspect of the present disclosure, the first node is a relay node.

The present disclosure provides a method in a second node for wireless communications, comprising:
  transmitting a first signaling and a first signal in a first time-frequency resource block; and
  receiving a second information block in a first radio resource block;
  herein, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

According to one aspect of the present disclosure, characterized in that the first time-frequency unit group is a candidate time-frequency unit group of K1 candidate time-frequency unit groups, K1 being a positive integer greater than 1, any candidate time-frequency unit group among the K1 candidate time-frequency unit groups comprises the first time-frequency unit.

According to one aspect of the present disclosure, characterized in that the first signaling indicates the first time-frequency unit group out of the K1 candidate time-frequency unit groups.

According to one aspect of the present disclosure, characterized in that any time-frequency unit in the first time-frequency unit group belongs to a time unit in a first time unit set in time domain, the first time unit set comprises a positive integer number of time unit(s); the first radio resource block group belongs to a target time unit in time domain; any time unit in the first time unit set is associated with the target time unit.

According to one aspect of the present disclosure, characterized in comprising:
  transmitting a second signaling set and a second signal set in a second time-frequency resource block group;
  herein, the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

According to one aspect of the present disclosure, characterized in that the first signaling is a first-type signaling, the first-type signaling comprising a first field; a reference first-type signaling is any said first-type signaling, and a data channel scheduled by the reference first-type signaling is used to determine a reference time-frequency unit, the first field in the reference first-type signaling indicates whether a radio resource occupied by a second-type channel corresponding to the reference first-type signaling is related to at least one time-frequency unit other than the reference time-frequency unit.

According to one aspect of the present disclosure, characterized in comprising:
  transmitting a first information block;
  herein, the first information block indicates a first time-frequency resource pool, the first time-frequency resource block belonging to the first time-frequency resource pool.

According to one aspect of the present disclosure, the second node is a UE.

According to one aspect of the present disclosure, the second node is a relay node.

The present disclosure provides a first node for wireless communications, comprising:

a first receiver, receiving a first signaling and a first signal in a first time-frequency resource block; and a first transmitter, transmitting a second information block in a first radio resource block;

herein, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

The present disclosure provides a second node for wireless communications, comprising:

a second transmitter, transmitting a first signaling and a first signal in a first time-frequency resource block; and a second receiver, receiving a second information block in a first radio resource block;

herein, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, compared with the prior art, the present disclosure is advantageous in the following aspects:

realizing the HARQ-ACK multiplexing in sidelink communications, improving the resource utilization ratio for a feedback channel, and streamlining the design of the feedback channel.

achieving dynamic handovers between a HARQ-ACK feedback mechanism supporting multiplexing and a HARQ-ACK feedback mechanism not supporting multiplexing, thus enhancing the flexibility and compatibility of the system.

BRIEF DESCRIPTION OF THE DRAWINGS

Other features, objects and advantages of the present disclosure will become more apparent from the detailed description of non-restrictive embodiments taken in conjunction with the following drawings:

FIG. 11 illustrates a schematic diagram of a second information block according to one embodiment of the present disclosure.

FIG. 12 illustrates a schematic diagram of a second information block according to one embodiment of the present disclosure.

FIG. 13 illustrates a schematic diagram of a first time-frequency unit being used to determine a first radio resource block group according to one embodiment of the present disclosure.

FIG. 14 illustrates a schematic diagram of a first time-frequency unit being used to determine a first radio resource block group according to one embodiment of the present disclosure.

FIG. 15 illustrates a schematic diagram of K1 candidate time-frequency unit groups according to one embodiment of the present disclosure.

FIG. 16 illustrates a schematic diagram of a first time unit set and a target time unit according to one embodiment of the present disclosure.

FIG. 17 illustrates a schematic diagram of a second time-frequency resource block group according to one embodiment of the present disclosure.

FIG. 18 illustrates a schematic diagram of a second time-frequency resource block group according to one embodiment of the present disclosure.

FIG. 19 illustrates a schematic diagram of a second signaling set and a second signal set according to one embodiment of the present disclosure.

FIG. 20 illustrates a schematic diagram of a second signaling set and a second signal set according to one embodiment of the present disclosure.

FIG. 21 illustrates a flowchart of a reference first-type signaling according to one embodiment of the present disclosure.

FIG. 22 illustrates a schematic diagram of a first information block according to one embodiment of the present disclosure.

FIG. 23 illustrates a structure block diagram of a processing device in a first node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
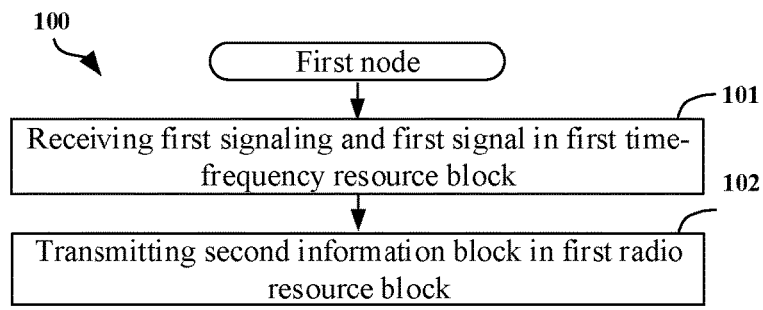
FIG. 1 illustrates a flowchart of a first signaling, a first signal and a second information block according to one embodiment of the present disclosure.

Embodiment 1 illustrates a flowchart of a first signaling, a first signal and a second information block according to one embodiment of the present disclosure, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present disclosure receives a first signaling and a first signal in a first time-frequency resource block in step 101; and transmits a second information block in a first radio resource block in step 102. Herein, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, a said time-frequency unit comprises a slot in time domain and comprises a sub-channel in frequency domain.

In one embodiment, the first time-frequency resource block is the first time-frequency unit.

In one embodiment, frequency-domain resources occupied by the first time-frequency resource block are all frequency-domain resources in the first time-frequency unit, while time-domain resources occupied by the first time-frequency resource block are partial time-domain resources in the first time-frequency unit.

In one embodiment, the first signaling is a dynamic signaling.

In one embodiment, the first signaling is a layer 1 (L1) signaling.

In one embodiment, the first signaling is a layer 1 (L1) control signaling.

In one embodiment, the first signaling comprises Sidelink Control Information (SCI).

In one embodiment, the first signaling comprises one or more fields in an SCI.

In one embodiment, the first signaling comprises Downlink Control Information (DCI).

In one embodiment, the first signaling is transmitted in SideLink.

In one embodiment, the first signaling is transmitted via a PC5 interface.

In one embodiment, the first signaling is transmitted in DownLink.

In one embodiment, the first signaling is transmitted by Unicast.

In one embodiment, the first signaling is transmitted by Groupcast.

In one embodiment, the first signaling is transmitted by Broadcast.

In one embodiment, the first signaling indicates that the first radio resource block group is related to at least one said time-frequency unit orthogonal with the first time-frequency unit in time domain.

In one embodiment, the first signal is a radio signal.

In one embodiment, the first signal is a baseband signal.

In one embodiment, the first signal is transmitted in SideLink.

In one embodiment, the first signal is transmitted via a PC5 interface.

In one embodiment, the first signal is transmitted by Unicast.

In one embodiment, the first signal is transmitted by Groupcast.

In one embodiment, the first signal is transmitted by Broadcast.

In one embodiment, the scheduling information comprises one or more of an occupied time-domain resource, an occupied frequency-domain resource, a Modulation and Coding Scheme (MCS), configuration information for DeModulation Reference Signals (DMRS), a Hybrid Automatic Repeat reQuest (HARQ) process number, a Redundancy Version (RV) or a New Data Indicator (NDI).

In one embodiment, the phrase that the first signal carries a first bit block set comprises: the first signal comprises an output by all or part of bits in the first bit block set sequentially through Cyclic Redundancy Check (CRC) Attachment, Channel Coding, Rate Matching, a Modulation Mapper, a Layer Mapper, a transform precoder, Precoding, a Resource Element Mapper, Multicarrier Symbol Generation, and Modulation and Upconversion.

In one embodiment, the phrase that the first signal carries a first bit block set comprises: the first signal comprises an output by all or part of bits in the first bit block set sequentially through CRC Attachment, Channel Coding, Rate Matching, a Modulation Mapper, a Layer Mapper, Precoding, a Resource Element Mapper, Multicarrier Symbol Generation, and Modulation and Upconversion.

In one embodiment, the phrase that the first signal carries a first bit block set comprises: all or part of bits in the first bit block set are used to generate the first signal.

In one embodiment, the first signal does not occupy time-frequency resources within any time-frequency unit in the first time-frequency unit group other than the first time-frequency unit.

In one embodiment, time-frequency resources occupied by the first signal and the first signaling are mutually orthogonal.

In one embodiment, the first signaling and the first signal belong to a same slot in time domain.

In one embodiment, the first signaling and the first signal belong to a same said time unit in time domain.

In one embodiment, the first signaling and the first signal are respectively transmitted in a first time-frequency resource sub-block and a second time-frequency resource sub-block in the first time-frequency resource block; the first time-frequency resource sub-block and the second time-frequency resource sub-block respectively comprise a positive integer number of REs; the first time-frequency resource sub-block and the second time-frequency resource sub-block make up the first time-frequency resource block, and the first time-frequency resource sub-block and the second time-frequency resource sub-block are orthogonal.

In one subembodiment, the first time-frequency resource sub-block occupies partial time-domain resources in the first time-frequency resource block in time domain.

In one subembodiment, the first time-frequency resource sub-block occupies a positive integer number of earliest multicarrier symbol(s) in the first time-frequency resource block in time domain.

In one subembodiment, the first time-frequency resource sub-block occupies partial frequency-domain resources in the first time-frequency resource block in frequency domain.

In one subembodiment, the first time-frequency resource sub-block occupies a positive integer number of lowest sub-channel(s) in the first time-frequency resource block in frequency domain.

In one subembodiment, the first time-frequency resource sub-block occupies all frequency-domain resources in the first time-frequency resource block.

In one subembodiment, the first time-frequency resource sub-block occupies all time-domain resources in the first time-frequency resource block.

In one embodiment, the first bit block set comprises a positive integer number of bit block(s), and any bit block comprised in the first bit block set comprises a positive integer number of binary bit(s).

In one embodiment, the first bit block set only comprises one bit block.

In one embodiment, the first bit block set comprises multiple bit blocks.

In one embodiment, any bit block in the first bit block set is a Transport Block (TB).

In one embodiment, any bit block in the first bit block set is a Code Block (CB).

In one embodiment, any bit block in the first bit block set is a Code Block Group (CBG).

In one embodiment, any bit block in the first bit block set is a TB or a CBG.

In one embodiment, a time-domain resource occupied by each time-frequency unit in the first time-frequency unit group is used to determine a time-domain resource occupied by the first radio resource block group.

In one embodiment, a frequency-domain resource occupied by each time-frequency unit in the first time-frequency unit group is used to determine a frequency-domain resource occupied by the first radio resource block group.

In one embodiment, a frequency-domain resource occupied by each time-frequency unit in the first time-frequency unit group is used to determine a frequency-domain resource and a code-domain resource occupied by the first radio resource block group.

In one embodiment, a frequency-domain resource occupied by an earliest time-frequency unit in the first time-frequency unit group is used to determine a frequency-domain resource occupied by the first radio resource block group.

In one embodiment, a frequency-domain resource occupied by an earliest time-frequency unit in the first time-frequency unit group is used to determine a frequency-domain resource and a code-domain resource occupied by the first radio resource block group.

In one embodiment, a time-frequency resource occupied by each time-frequency unit in the first time-frequency unit group is used to determine a frequency-domain resource occupied by the first radio resource block group.

In one embodiment, a time-frequency resource occupied by each time-frequency unit in the first time-frequency unit group is used to determine a frequency-domain resource and a code-domain resource occupied by the first radio resource block group.

In one embodiment, a time-domain resource occupied by each time-frequency unit in the first time-frequency unit group and a frequency-domain resource occupied by an earliest time-frequency unit in the first time-frequency unit group are jointly used to determine a frequency-domain resource occupied by the first radio resource block group.

In one embodiment, a time-domain resource occupied by each time-frequency unit in the first time-frequency unit group and a frequency-domain resource occupied by an earliest time-frequency unit in the first time-frequency unit group are jointly used to determine a frequency-domain resource and a code-domain resource occupied by the first radio resource block group.

In one embodiment, the first radio resource block group comprises a positive integer number of radio resource block(s).

In one embodiment, the first radio resource block group comprises only the first radio resource block.

In one embodiment, the first radio resource block group comprises multiple radio resource blocks.

In one subembodiment, any two radio resource blocks in the first radio resource block group occupy a same time-domain resource.

In one subembodiment, any two radio resource blocks in the first radio resource block group occupy mutually orthogonal frequency-domain resources.

In one subembodiment, any two radio resource blocks in the first radio resource block group occupy a same time-frequency resource and different code-domain resources.

In one subembodiment, there are two radio resource blocks in the first radio resource block group occupying a same time-frequency resource and different code-domain resources.

In one subembodiment, an IDentity (ID) of a transmitter for the first signal is used to determine the first radio resource block in the first radio resource block group.

In one subembodiment, a source ID of the first signal is used to determine the first radio resource block in the first radio resource block group.

In one subembodiment, an ID of the first node is used to determine the first radio resource block in the first radio resource block group.

In one subembodiment, a destination ID of the first signal is used to determine the first radio resource block in the first radio resource block group.

In one subembodiment, a target receiver for the first signal is a first node set, the first node set comprises a positive integer number of node(s), and the first node set comprises the first node; an index for the first node in the first node set is used to determine the first radio resource block in the first radio resource block group.

In one embodiment, the second information block comprises a positive integer number of information bit(s).

In one embodiment, the second information block indicates whether each bit block in the first bit block set is correctly received.

In one embodiment, the second information block indicates that each bit block in the first bit block set is correctly received, or that at least one bit block in the first bit block set is not correctly received.

In one embodiment, the second information block respectively indicates whether each bit block in the first bit block set is correctly received.

In one embodiment, the second information block carries a HARQ-ACK.

In one embodiment, the second information block carries an ACK.

In one embodiment, the second information block carries a Negative ACKnowledgement (NACK).

In one embodiment, the first time-frequency unit is used to determine the first time-frequency unit group.

In one embodiment, the first time-frequency unit group is a candidate time-frequency unit group of Q1 candidate time-frequency unit groups, Q1 being a positive integer greater than 1, only the first time-frequency unit group among the Q1 candidate time-frequency unit groups comprises the first time-frequency unit.

In one subembodiment, the Q1 candidate time-frequency unit groups are determined by a higher-layer signaling.

In one subembodiment, the first information block in the present disclosure is used to determine the Q1 candidate time-frequency unit groups.

In one subembodiment, any of the Q1 candidate time-frequency unit groups comprises multiple time-frequency units that are mutually orthogonal in time domain.

In one subembodiment, there is one candidate time-frequency unit group among the Q1 candidate time-frequency unit groups that only comprises one time-frequency unit.

In one embodiment, the time units to which all time-frequency units in the first time-frequency unit group respectively belong make up a first combination, the first combination is a candidate combination among Q2 candidate combinations, Q2 being a positive integer greater than 1; any of the Q2 candidate combinations comprises a positive integer number of the time unit(s); among the Q2 candidate combinations only the first combination comprises a time unit to which the first time-frequency unit belongs.

In one subembodiment, a time unit to which the first time-frequency unit belongs is used to determine the first combination.

In one subembodiment, a frequency-domain resource occupied by the first time-frequency unit is used to determine a frequency-domain resource occupied by each time-frequency unit in the first time-frequency unit group.

In one subembodiment, a starting subcarrier occupied by the first time-frequency unit is used to determine a starting subcarrier occupied by each time-frequency unit in the first time-frequency unit group.

In one subembodiment, the Q2 candidate combinations are configured by a higher-layer signaling.

In one subembodiment, the Q2 candidate combinations are configured by the first information block in the present disclosure.

In one subembodiment, any of the Q2 candidate combinations comprises multiple time units that are mutually orthogonal.

In one subembodiment, there is one candidate combination among the Q2 candidate combinations that only comprises 1 time unit.

Embodiment 2

Figure 2:
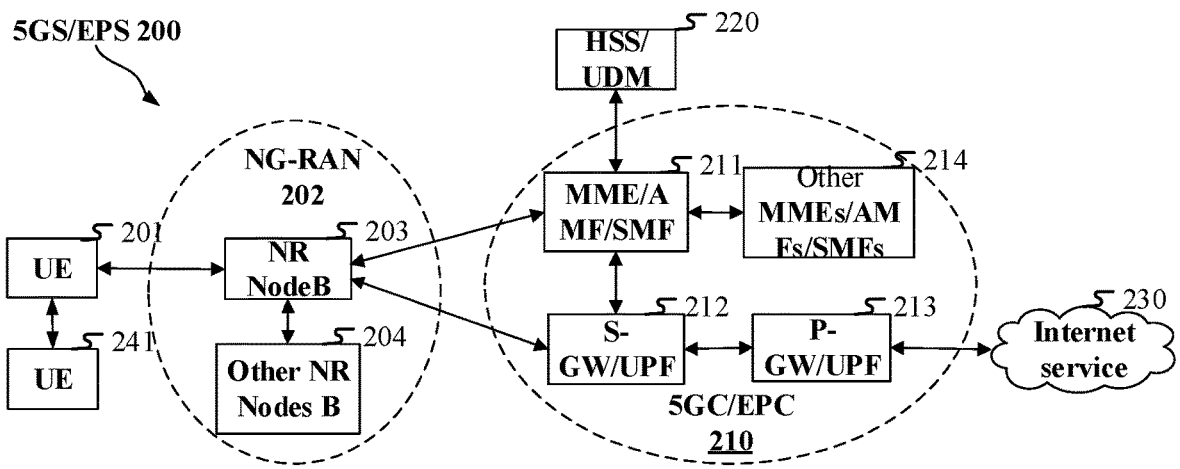
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LIE), Long-Term Evolution Advanced (LIE-A) and future 5G systems. The network architecture 200 LTE, LIE-A and future 5G systems may be called an Evolved Packet System (EPS) 200. The 5G NR or LIE network architecture 200 may be called a 5G System/Evolved Packet System (5GS/EPS) 200 or other suitable terminology. The 5GS/EPS 200 may comprise one or more UEs 201, a UE 241 in sidelink communication with UE(s) 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present disclosure includes the UE 201.

In one embodiment, the first node in the present disclosure includes the UE 241.

In one embodiment, the second node in the present disclosure includes the UE 241.

In one embodiment, the second node in the present disclosure includes the UE 201.

In one embodiment, an air interface between the UE201 and the gNB203 is a Uu interface.

In one embodiment, a radio link between the UE201 and the gNB203 is a cellular link.

In one embodiment, an air interface between the UE201 and the UE241 is a PC5 interface.

In one embodiment, a radio link between the UE201 and the UE241 is a sidelink.

In one embodiment, the first node in the present disclosure is a terminal within coverage of the gNB203, and the second node in the present disclosure is a terminal within coverage of the gNB203.

In one embodiment, the first node in the present disclosure is a terminal within coverage of the gNB203, and the second node in the present disclosure is a terminal out of coverage of the gNB203.

In one embodiment, the first node in the present disclosure is a terminal out of coverage of the gNB203, and the second node in the present disclosure is a terminal within coverage of the gNB203.

In one embodiment, the first node in the present disclosure is a terminal out of coverage of the gNB203, and the second node in the present disclosure is a terminal out of coverage of the gNB203.

In one embodiment, Unicast transmission is supported between the UE 201 and the UE 241.

In one embodiment, Broadcast transmission is supported between the UE 201 and the UE 241.

In one embodiment, Groupcast transmission is supported between the UE 201 and the UE 241.

In one embodiment, a transmitter for the first signaling and the first signal in the present disclosure includes the UE241.

In one embodiment, a receiver for the first signaling and the first signal in the present disclosure includes the UE201.

In one embodiment, a transmitter for the second information block in the present disclosure includes the UE201.

In one embodiment, a receiver for the second information block in the present disclosure includes the UE241.

Embodiment 3

Figure 3:
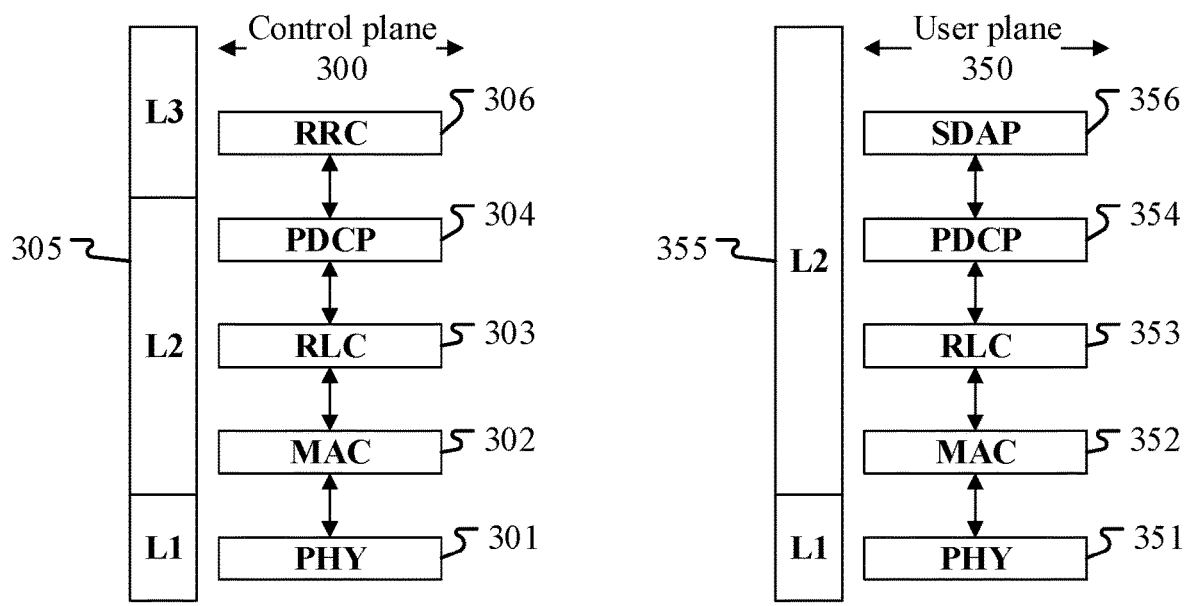
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, i.e., layer 1, layer 2 and layer 3. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first signaling is generated by the PHY 301, or the PHY 351.

In one embodiment, the first signaling is generated by the MAC sublayer 352, or the MAC sublayer 302.

In one embodiment, the first signal is generated by the PHY 301, or the PHY 351.

In one embodiment, the second information block is generated by the PHY 301, or the PHY 351.

In one embodiment, any signaling in the second signaling set is generated by the PHY 301, or the PHY 351.

In one embodiment, any signaling in the second signaling set is generated by the MAC sublayer 352, or the MAC sublayer 302.

In one embodiment, any signal in the second signal set is generated by the PHY 301, or the PHY 351.

In one embodiment, the first information block is generated by the RRC sublayer 306.

Embodiment 4

Figure 4:
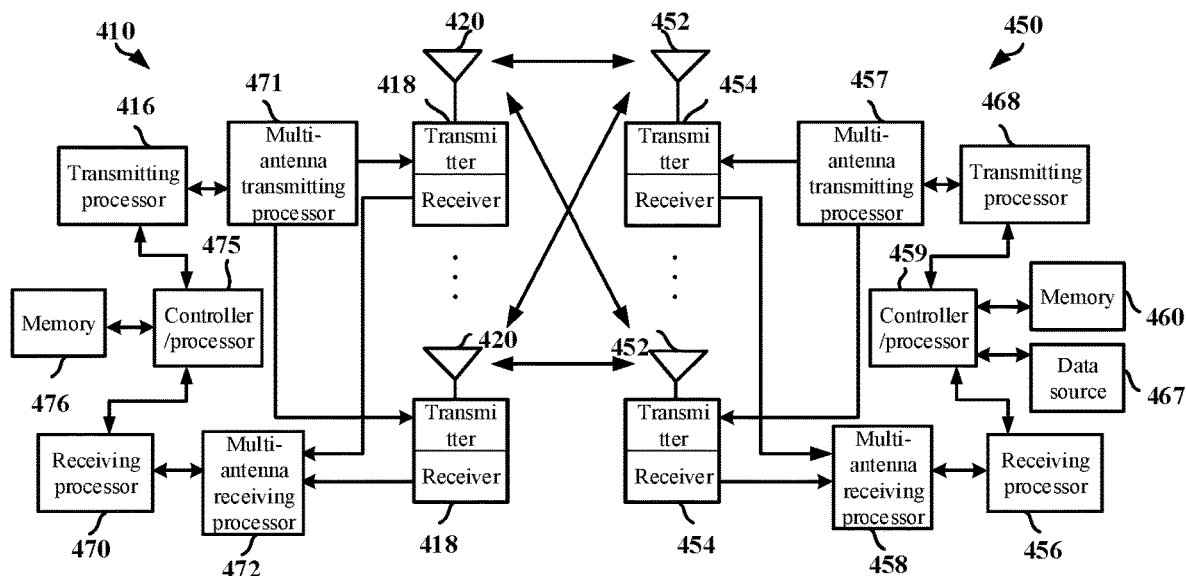
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least receives the first signaling and the first signal in the present disclosure in the first time-frequency resource block in the present disclosure, and transmits the second information block in the present disclosure in the first radio resource block in the present disclosure; the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the second communication device 450 comprises a memory that stores computer readable instruction program, the computer readable instruction program generates an action when executed by at least one processor, which includes: receiving the first signaling and the first signal in the present disclosure in the first time-frequency resource block in the present disclosure, and transmitting the second information block in the present disclosure in the first radio resource block in the present disclosure; the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first communication device 410 comprises at least one processor and at least one memory. The at least one memory comprises computer program codes; the at least one memory and the computer program codes are configured to be used in collaboration with the at least one processor. The first communication device 410 at least transmits the first signaling and the first signal in the present disclosure in the first time-frequency resource block in the present disclosure, and receives the second information block in the present disclosure in the first radio resource block in the present disclosure; the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first communication device 410 comprises a memory that stores computer readable instruction program, the computer readable instruction program generates an action when executed by at least one processor, which includes: transmitting the first signaling and the first signal in the present disclosure in the first time-frequency resource block in the present disclosure, and receiving the second information block in the present disclosure in the first radio resource block in the present disclosure; the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the first signaling and the first signal in the present disclosure in the first time-frequency resource block in the present disclosure; at least one of the antenna 420, the transmitter 418, the transmitting processor 416, the multi-antenna transmitting processor 471, the controller/processor 475 or the memory 476 is used to transmit the first signaling and the first signal in the present disclosure in the first time-frequency resource block in the present disclosure.

In one embodiment, at least one of the antenna 420, the receiver 418, the receiving processor 470, the multi-antenna receiving processor 472, the controller/processor 475, or the memory 476 is used to receive the second information block in the present disclosure in the first radio resource block in the present disclosure; at least one of the antenna 452, the transmitter 454, the transmitting processor 468, the multi-antenna transmitting processor 457, the controller/processor 459, the memory 467 or the data source 467 is used to transmit the second information block in the present disclosure in the first radio resource block in the present disclosure.

In one embodiment, at least one of the antenna 452, the receiver 454, the receiving processor 456, the multi-antenna receiving processor 458, the controller/processor 459, the memory 460 or the data source 467 is used to receive the second signaling set and the second signal set in the present disclosure in the second time-frequency resource block group in the present disclosure; at least one of the antenna 420, the transmitter 418, the transmitting processor 416, the multi-antenna transmitting processor 471, the controller/processor 475 or the memory 476 is used to transmit the second signaling set and the second signal set in the present disclosure in the second time-frequency resource block group in the present disclosure.

In one embodiment, at least one of the antenna 452, the receiver 454, the receiving processor 456, the multi-antenna receiving processor 458, the controller/processor 459, the memory 460 or the data source 467 is used to receive the first information block in the present disclosure; at least one of the antenna 420, the transmitter 418, the transmitting processor 416, the multi-antenna transmitting processor 471, the controller/processor 475 or the memory 476 is used to transmit the first information block in the present disclosure.

Embodiment 5

Figure 5:
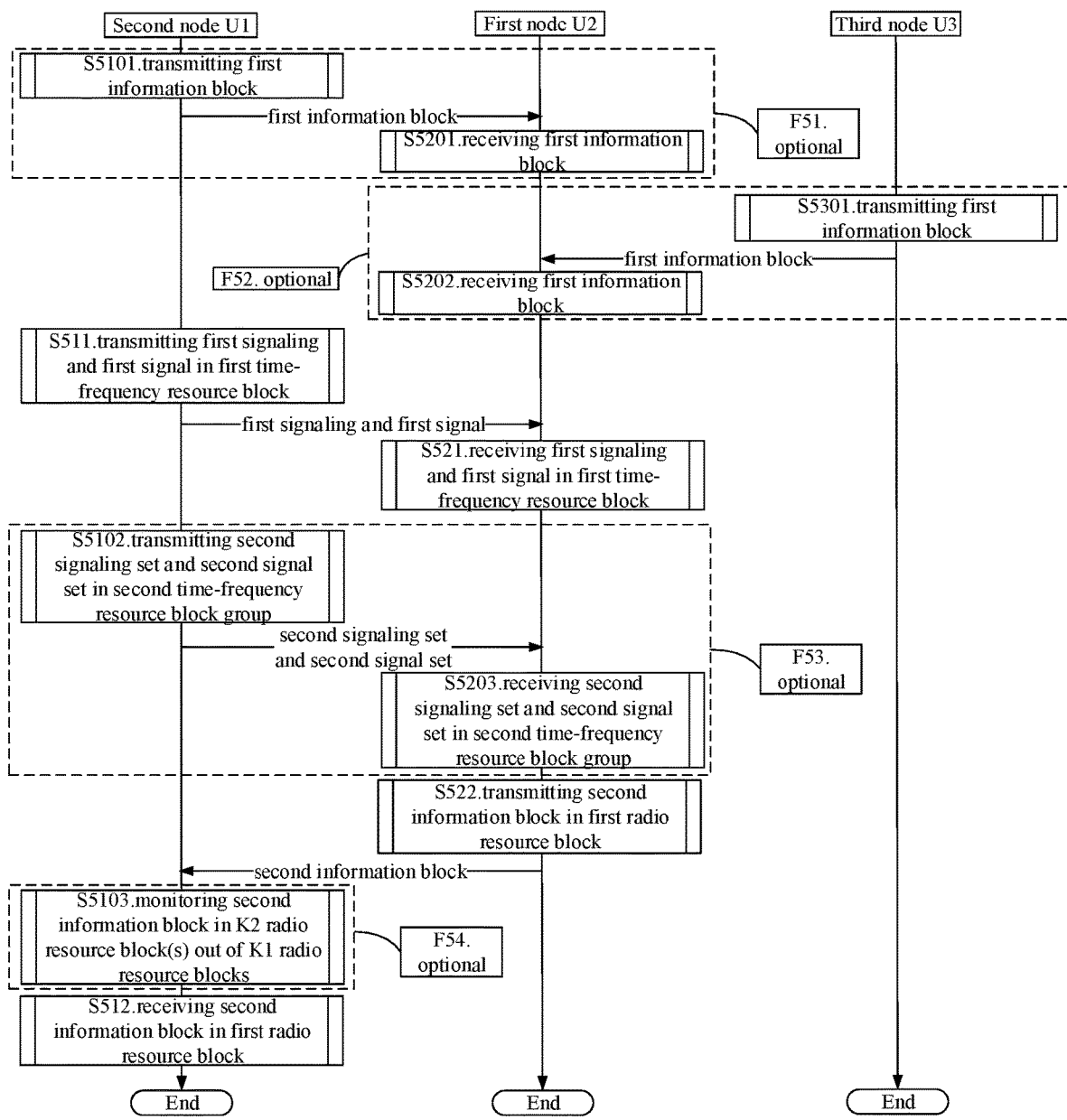
FIG. 5 illustrates a flowchart of transmission according to one embodiment of the present disclosure.

Embodiment 5 illustrates a flowchart of wireless transmission according to one embodiment of the present disclosure, as shown in FIG. 5. In FIG. 5, a second node U1, a first node U2 and a third node U3 are communication nodes mutually in transmissions via air interfaces. In FIG. 5, steps marked by boxes F51 to F54 are optional, respectively. The steps marked by the box F51 and the box F52 in FIG. 5 cannot co-exist.

The second node U1 transmits a first information block in step S5101; transmits a first signaling and a first signal in a first time-frequency resource block in step S511, and transmits a second signaling set and a second signal set in a second time-frequency resource block group in step S5102; monitors a second information block in K2 radio resource blocks among K1 radio resource blocks in step S5103; and receives the second information block in a first radio resource block in step S512.

The first node U2 transmits a first information block in step S5201; and receives a first information block in step S5202; receives a first signaling and a first signal in a first time-frequency resource block in step S521; receives a second signaling set and a second signal set in a second time-frequency resource block group in step S5203; and transmits a second information block in a first radio resource block in step S522.

The third node U3 transmits a first information block in step S5301.

In Embodiment 5, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first node U2 is the first node in the present disclosure.

In one embodiment, the second node U1 is the second node in the present disclosure.

In one embodiment, the third node U3 is a base station.

In one embodiment, an air interface between the second node U1 and the first node U2 is a PC5 interface.

In one embodiment, an air interface between the second node U1 and the first node U2 includes a sidelink.

In one embodiment, an air interface between the second node U1 and the first node U2 includes a radio interface between a UE and another UE.

In one embodiment, an air interface between the second node U1 and the first node U2 includes a radio interface between a UE and a relay node.

In one embodiment, an air interface between the third node U3 and the first node U2 is a Uu interface.

In one embodiment, an air interface between the third node U3 and the first node U2 includes a cellular link.

In one embodiment, an air interface between the third node U3 and the first node U2 includes a radio interface between a base station and a UE.

In one embodiment, the first node in the present disclosure is a terminal.

In one embodiment, the first node in the present disclosure is an automobile.

In one embodiment, the first node in the present disclosure is a vehicle.

In one embodiment, the first node in the present disclosure is a Road Side Unit (RSU).

In one embodiment, the second node in the present disclosure is a terminal.

In one embodiment, the second node in the present disclosure is an automobile.

In one embodiment, the second node in the present disclosure is a vehicle.

In one embodiment, the second node in the present disclosure is an RSU.

In one embodiment, the first time-frequency resource block is used by the first node to determine the first time-frequency unit.

In one embodiment, the first time-frequency resource block is used by the second node to determine the first time-frequency unit.

In one embodiment, the first time-frequency unit group is used by the first node to determine the first radio resource block group.

In one embodiment, the first time-frequency unit group is used by the second node to determine the first radio resource block group.

In one embodiment, the steps marked by the box F51 in FIG. 5 exist, while steps marked by the box F52 in FIG. 5 do not exist.

In one embodiment, the steps marked by the box F52 in FIG. 5 exist, while steps marked by the box F51 in FIG. 5 do not exist.

In one embodiment, the first information block indicates a first time-frequency resource pool, the first time-frequency resource block belonging to the first time-frequency resource pool.

In one embodiment, the first information block is transmitted on a PSSCH.

In one embodiment, the first information block is transmitted on a Physical Downlink Shared CHannel (PDSCH).

In one embodiment, the first information block is transmitted on a Physical Sidelink Broadcast Channel (PSBCH).

In one embodiment, the first informationblock is transmitted on a Physical Broadcast channel (PBCH).

In one embodiment, steps marked by the box F53 in FIG. 5 exist; the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

In one embodiment, any signaling in the second signaling set is transmitted on a Physical Sidelink Control Channel (PSCCH).

In one embodiment, any signal in the second signal set is transmitted on a PSSCH.

In one embodiment, the steps marked by the box F53 in FIG. 5 do not exist.

In one embodiment, the step marked by the box F54 in FIG. 5 exists; the method in the second node used for wireless communications comprises: monitoring the second information block in K2 radio resource block(s) out of K1 radio resource blocks, where K2 is positive integer no greater than K1; herein, the second node receives the second information block in the first radio resource block; the first time-frequency unit group is one of the K1 candidate time-frequency unit groups in the present disclosure; the K1 candidate time-frequency unit groups are respectively used to determine K1 radio resource block groups, the K1 radio resource blocks respectively belonging to the K1 radio resource block groups, the first radio resource block group is a radio resource block group corresponding to the first time-frequency unit group among the K1 radio resource block groups, the K2 radio resource blocks including the first radio resource block.

In one embodiment, a result of the monitoring is used by the second node to determine the first radio resource block group out of the K1 radio resource block groups.

In one embodiment, the monitoring refers to receiving based on coherent detection, that is, performing coherent reception and measuring energy of a signal obtained by the coherent reception; if the energy of the signal obtained by the coherent reception is larger than a first given threshold, it is determined that the second information block is received; otherwise, it is determined that the second information block is not received.

In one embodiment, the monitoring refers to blind decoding, that is, receiving a signal and performing decoding operation; if the decoding is determined to be correct according to a CRC bit, it is determined that the second information block is received; otherwise, it is determined that the second information block is not received.

In one embodiment, the phrase of monitoring the second information block comprises: the second node in the present disclosure determines whether the second information block is transmitted according to coherent detection.

In one embodiment, the phrase of monitoring the second information block comprises: the second node in the present disclosure determines whether the second information block is transmitted according to CRC.

In one embodiment, the phrase of monitoring the second information block comprises: the second node in the present disclosure determines according to coherent detection that the second information block is transmitted in the first radio resource block group among the K1 radio resource block groups.

In one embodiment, the phrase of monitoring the second information block comprises: the second node in the present disclosure determines according to CRC that the second information block is transmitted in the first radio resource block group among the K1 radio resource block groups.

In one embodiment, K2 is equal to K1.

In one embodiment, K2 is less than K1.

In one embodiment, K2 is equal to 1, the K2 radio resource block(s) being the first radio resource block.

In one embodiment, any candidate time-frequency unit group of the K1 candidate time-frequency unit groups is used to determine a corresponding radio resource block group in a way similar to that in which the first time-frequency unit group is used to determine the first radio resource block group.

In one embodiment, the first signaling is transmitted in a sidelink physical layer control channel (i.e., a sidelink channel only capable of bearing physical layer signaling).

In one embodiment, the first signaling is transmitted on a PSCCH.

In one embodiment, the first signal is transmitted in a sidelink physical layer data channel (i.e., a sidelink channel capable of bearing physical layer data).

In one embodiment, the first signal is transmitted on a PSSCH.

In one embodiment, the second information block is transmitted in a sidelink physical layer feedback channel (i.e., a sidelink channel only capable of bearing a physical layer HARQ feedback).

In one embodiment, the second information block is transmitted on a PSFCH.

Embodiment 6

Figure 6:
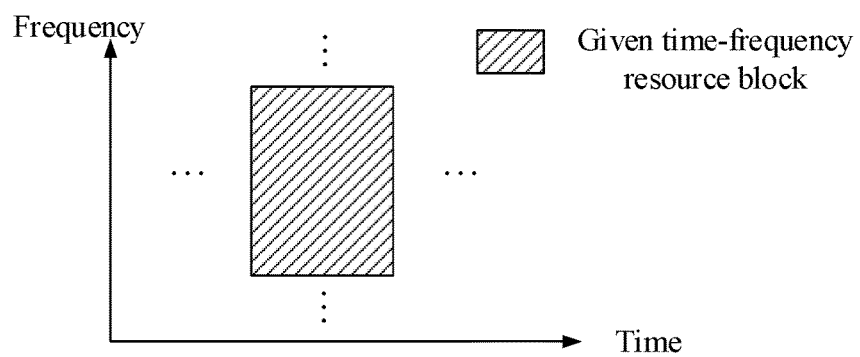
FIG. 6 illustrates a schematic diagram of a given time-frequency resource block according to one embodiment of the present disclosure.

Embodiment 6 illustrates a schematic diagram illustrating a given time-frequency resource block according to one embodiment of the present disclosure, as shown in FIG. 6. In Embodiment 6, the given time-frequency resource block is either the first time-frequency resource block or any time-frequency resource block in the second time-frequency resource block group.

In one embodiment, the given time-frequency resource block is the first time-frequency resource block.

In one embodiment, the given time-frequency resource block is any time-frequency resource block in the second time-frequency resource block group.

In one embodiment, the given time-frequency resource block comprises a positive integer number of Resource Element(s) (RE(s)).

In one embodiment, an RE occupies a multicarrier symbol in time domain, and a subcarrier in frequency domain.

In one embodiment, the multicarrier symbol is an Orthogonal Frequency Division Multiplexing (OFDM) Symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the given time-frequency resource block comprises a positive integer number of subcarrier(s) in frequency domain.

In one embodiment, the given time-frequency resource block comprises a positive integer number of Physical Resource Block(s) (PRB(s)) in frequency domain.

In one embodiment, the given time-frequency resource block comprises a positive integer number of sub-channel(s) in frequency domain.

In one embodiment, the given time-frequency resource block comprises a positive integer number of consecutive sub-channels in frequency domain.

In one embodiment, the given time-frequency resource block comprises a positive integer number of non-consecutive sub-channels in frequency domain.

In one embodiment, a said sub-channel comprises a positive integer number of subcarrier(s).

In one embodiment, a said sub-channel comprises a positive integer number of consecutive subcarriers.

In one embodiment, a said sub-channel comprises a positive integer number of PRB(s).

In one embodiment, a said sub-channel comprises a positive integer number of consecutive PRB(s).

In one embodiment, the given time-frequency resource block comprises a positive integer number of multicarrier symbol(s) in time domain.

In one embodiment, the given time-frequency resource block comprises a positive integer number of consecutive multicarrier symbols in time domain.

In one embodiment, the given time-frequency resource block comprises a positive integer number of slot(s) in time domain.

In one embodiment, the given time-frequency resource block comprises a positive integer number of sub-frame(s) in time domain.

Embodiment 7

Figure 7:
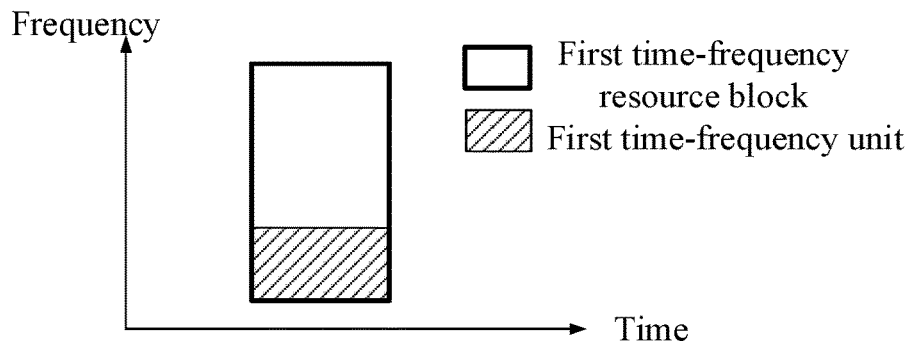
FIG. 7 illustrates a schematic diagram of a first time-frequency resource block and a first time-frequency unit according to one embodiment of the present disclosure.

Embodiment 7 illustrates a schematic diagram illustrating a first time-frequency resource block and a first time-frequency unit according to one embodiment of the present disclosure, as shown in FIG. 7. In Embodiment 7, the first time-frequency resource block and the first time-frequency unit are overlapping.

In one embodiment, a said time-frequency unit comprises a positive integer number of RE(s).

In one embodiment, a said time-frequency unit comprises a said time unit in time domain.

In one embodiment, a said time-frequency unit comprises a slot in time domain.

In one embodiment, a said time-frequency unit comprises a sub-frame in time domain.

In one embodiment, a said time-frequency unit comprises a positive integer number of consecutive multicarrier symbols in time domain.

In one embodiment, a said time-frequency unit comprises a positive integer number of consecutive slots in time domain.

In one embodiment, a said time-frequency unit comprises a sub-channel in frequency domain.

In one embodiment, a said time-frequency unit comprises a PRB in frequency domain.

In one embodiment, a said time-frequency unit comprises a positive integer number of consecutive subcarriers in frequency domain.

In one embodiment, a said time-frequency unit comprises a positive integer number of consecutive PRBs in frequency domain.

In one embodiment, a said time-frequency unit comprises a positive integer number of consecutive sub-channels in frequency domain.

In one embodiment, a said time-frequency unit is a scheduling unit for a PSSCH in time-frequency domain.

In one embodiment, a time-domain resource comprised by a said time-frequency unit is a scheduling unit for a PSSCH in time domain.

In one embodiment, a frequency-domain resource comprised by a said time-frequency unit is a scheduling unit for a PSSCH in frequency domain.

In one embodiment, the first time-frequency resource block and the first time-frequency unit are overlapping.

In one embodiment, the first time-frequency resource block occupies all time-domain resources in the first time-frequency unit in time domain.

In one embodiment, frequency-domain resources comprised in the first time-frequency resource block are used to determine a frequency-domain resource in the first time-frequency unit, while time-domain resources comprised in the first time-frequency resource block are used to determine a time-domain resource in the first time-frequency unit.

In one embodiment, a frequency-domain resource occupied by the first time-frequency unit is a starting sub-channel occupied by the first time-frequency resource block.

In one embodiment, a frequency-domain resource occupied by the first time-frequency unit is a sub-channel with a highest index occupied by the first time-frequency resource block.

In one embodiment, a frequency-domain resource occupied by the first time-frequency unit is a starting PRB occupied by the first time-frequency resource block.

In one embodiment, a time-domain resource occupied by the first time-frequency unit is the time unit to which time-domain resources occupied by the first time-frequency resource block belong.

In one embodiment, a time-domain resource occupied by the first time-frequency unit is a slot to which time-domain resources occupied by the first time-frequency resource block belong.

In one embodiment, the first time-frequency resource block comprises multiple said time-frequency units, the first time-frequency unit being a time-frequency unit occupying a lowest frequency-domain resource in the first time-frequency resource block.

In one embodiment, the first time-frequency resource block comprises multiple said time-frequency units, the first time-frequency unit being a time-frequency unit occupying a highest frequency-domain resource in the first time-frequency resource block.

In one embodiment, the first time-frequency resource block comprises multiple said time-frequency units occupying a same time-domain resource and consecutive frequency-domain resources.

Embodiment 8

Figure 8:
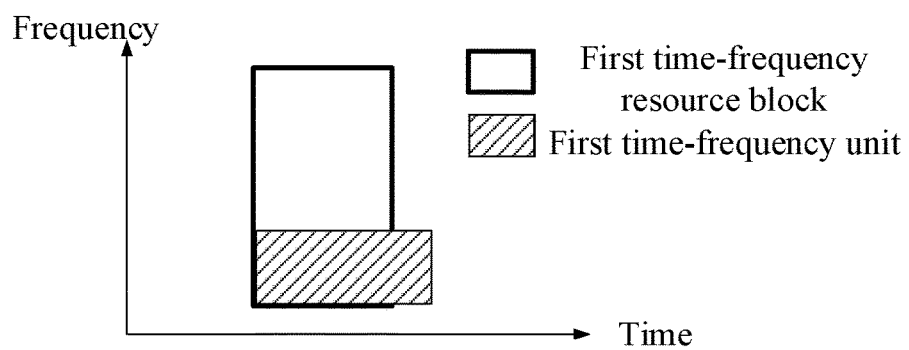
FIG. 8 illustrates a schematic diagram of a first time-frequency resource block and a first time-frequency unit according to one embodiment of the present disclosure.

Embodiment 8 illustrates a schematic diagram illustrating a first time-frequency resource block and a first time-frequency unit according to one embodiment of the present disclosure, as shown in FIG. 8. In Embodiment 8, the first time-frequency resource block occupies partial time-domain resources in the first time-frequency unit in time domain.

In one embodiment, the first time-frequency resource block does not occupy a positive integer number of latest multicarrier symbol(s) in the first time-frequency unit in time domain.

Embodiment 9

Figure 9:
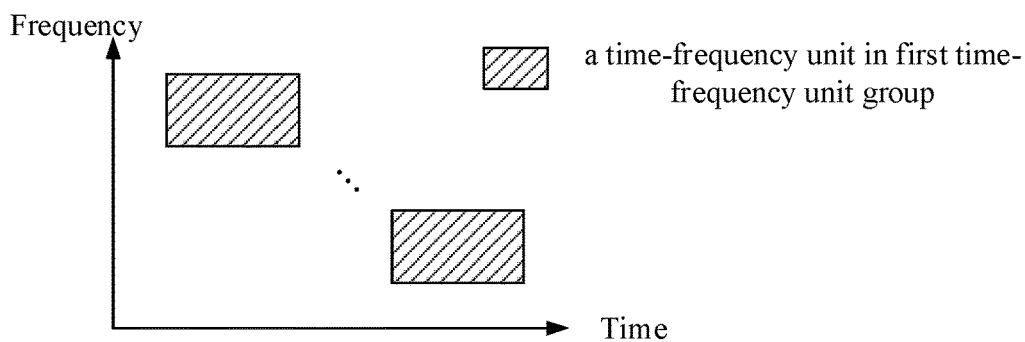
FIG. 9 illustrates a schematic diagram of a first time-frequency unit group according to one embodiment of the present disclosure.

Embodiment 9 illustrates a schematic diagram illustrating a first time-frequency unit group according to one embodiment of the present disclosure, as shown in FIG. 9. In Embodiment 9, the first time-frequency unit group comprises the first time-frequency unit and at least one said time-frequency unit other than the first time-frequency unit.

In one embodiment, all time-frequency units in the first time-frequency unit group belong to a same serving cell.

In one embodiment, all time-frequency units in the first time-frequency unit group belong to a same carrier in frequency domain.

In one embodiment, all time-frequency units in the first time-frequency unit group belong to a same Bandwidth Part (BWP) in frequency domain.

In one embodiment, all time-frequency units in the first time-frequency unit group belong to a same SideLink (SL) BWP in frequency domain.

In one embodiment, there is a time-frequency unit in the first time-frequency unit group that is earlier than the first time-frequency unit.

In one embodiment, there is a time-frequency unit in the first time-frequency unit group that is later than the first time-frequency unit.

In one embodiment, an interval between frequency-domain resources occupied by any two said time-frequency units adjacent in time domain in the first time-frequency unit group is configured by a higher layer signaling.

In one embodiment, an interval between frequency-domain resources occupied by any two said time-frequency units adjacent in time domain in the first time-frequency unit group is a first frequency-domain interval.

In one embodiment, time-frequency units in the first time-frequency unit group are sequentially arranged according to a precedence order in time domain; an interval between frequency-domain resources occupied by an i-th time-frequency unit and a first time-frequency unit in the first time-frequency unit group is a first frequency-domain interval, where i is any even number no greater than a number of the time-frequency units comprised in the first time-frequency unit group.

In one subembodiment, a j-th time-frequency unit in the first time-frequency unit group occupies a same frequency-domain resource as the 1st time-frequency unit in the first time-frequency unit group, where j is an odd number greater than 1 and no greater than a number of the time-frequency units comprised in the first time-frequency unit group.

In one embodiment, the first frequency-domain interval is configured by a higher layer signaling.

In one embodiment, the first frequency-domain interval is configured by an RRC signaling.

In one embodiment, the first frequency-domain interval is pre-configured.

In one embodiment, the first frequency-domain interval is configured by the first information block in the present disclosure.

In one embodiment, the first frequency-domain interval is a non-negative integer.

In one embodiment, the first frequency-domain interval is a positive integer.

In one embodiment, the first frequency-domain interval is measured in PRBs.

In one embodiment, the first frequency-domain interval is measured in sub-channels.

In one embodiment, an interval between frequency-domain resources occupied by two time-frequency units refers to a frequency interval between lowest subcarriers occupied by the two time-frequency units.

In one embodiment, an interval between frequency-domain resources occupied by two time-frequency units refers to a frequency interval between starting subcarriers occupied by the two time-frequency units.

In one embodiment, an interval between frequency-domain resources occupied by two time-frequency units refers to a frequency interval between starting sub-channels occupied by the two time-frequency units.

Embodiment 10

Figure 10:
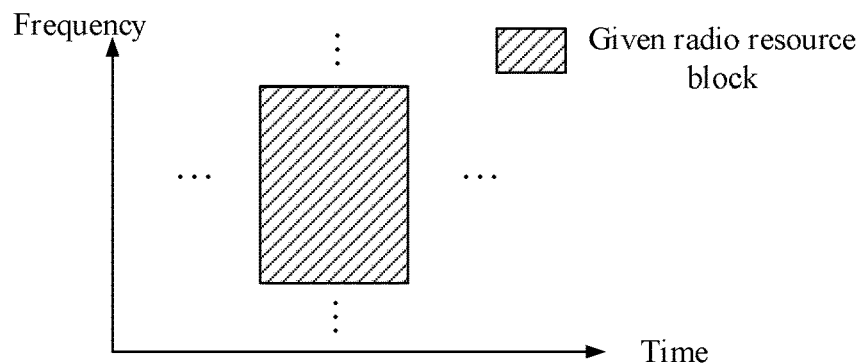
FIG. 10 illustrates a schematic diagram of a given radio resource block according to one embodiment of the present disclosure.

Embodiment 10 illustrates a schematic diagram illustrating a given radio resource block according to one embodiment of the present disclosure, as shown in FIG. 10. In Embodiment 10, the given radio resource block is any radio resource block in the first radio resource block group.

In one embodiment, the given radio resource block is the first radio resource block.

In one embodiment, the given radio resource block comprises a time-domain resource and a frequency-domain resource.

In one embodiment, the given radio resource block comprises a time-domain resource, a frequency-domain resource and a code-domain resource.

In one embodiment, the code-domain resource comprises one or more of a pseudo-random sequence, a Zadoff-Chu sequence, a low Peak-to-Average Power Ratio (low-PAPR) sequence, a cyclic shift, an Orthogonal Cover Code (OCC), an orthogonal sequence, a frequency-domain orthogonal sequence or a time-domain orthogonal sequence.

In one embodiment, the given radio resource block comprises a positive integer number of RE(s) in time-frequency domain.

In one embodiment, the given radio resource block comprises a positive integer number of subcarrier(s) in frequency domain.

In one embodiment, the given radio resource block comprises a positive integer number of PRB(s) in frequency domain.

In one embodiment, the given radio resource block comprises 1 PRB in frequency domain.

In one embodiment, the given radio resource block comprises 2 contiguous PRBs in frequency domain.

In one embodiment, the given radio resource block comprises 4 contiguous PRBs in frequency domain.

In one embodiment, the given radio resource block comprises a positive integer number of sub-channel(s) in frequency domain.

In one embodiment, the given radio resource block comprises a positive integer number of multicarrier symbol(s) in time domain.

In one embodiment, the given radio resource block comprises 1 multicarrier symbol in time domain.

In one embodiment, the given radio resource block comprises 2 contiguous multicarrier symbols in time domain.

In one embodiment, the given radio resource block comprises a positive integer number of slot(s) in time domain.

In one embodiment, the given radio resource block comprises a positive integer number of sub-frame(s) in time domain.

In one embodiment, the given radio resource block comprises a PSFCH resource.

In one embodiment, the given radio resource block comprises multiple PSFCH resources.

In one embodiment, the given radio resource block is reserved for a PSFCH.

In one embodiment, the given radio resource block is reserved for a HARQ-ACK for sidelink.

In one embodiment, the given radio resource block is reserved for a HARQ-ACK for V2X.

Embodiment 11

Embodiment 11 illustrates a schematic diagram of a second information block according to one embodiment of the present disclosure, as shown in FIG. 11. In Embodiment 11, the first time-frequency unit group comprises P time-frequency units, P being a positive integer greater than 1; the first time-frequency unit is one of the P time-frequency units; the second information block comprises P information sub-blocks, the P information sub-blocks respectively corresponding to the P time-frequency units. In FIG. 11, indexes for the P information sub-blocks are #0 ..., and #(P−1), respectively.

In one embodiment, a number of information bits comprised in the second information block is related to the first time-frequency unit group.

In one embodiment, a number of information bits comprised in the second information block is related to a number of time-frequency units comprised in the first time-frequency unit group.

In one embodiment, a number of information bits comprised in the second information block is linearly correlated to a number of time-frequency units comprised in the first time-frequency unit group, and a linear coefficient between the number of information bits comprised in the second information block and the number of time-frequency units comprised in the first time-frequency unit group is a positive number.

In one embodiment, the P information sub-blocks are respectively reserved for HARQ-ACKs corresponding to P PSSCHs, the P PSSCHs respectively occupying all frequency-domain resources and all or partial time-domain resources in the P time-frequency units.

In one subembodiment, starting sub-channels occupied by the P PSSCHs are respectively sub-channels occupied by the P time-frequency units.

In one subembodiment, any of the P PSSCHs does not occupy time-frequency resources within any time-frequency unit other than a corresponding time-frequency unit among the P time-frequency units.

In one embodiment, any information sub-block of the P information sub-blocks only comprises one information bit.

In one embodiment, there is one information sub-block among the P information sub-blocks comprising multiple information bits.

In one embodiment, a first information sub-block is one of the P information sub-blocks corresponding to the first time-frequency unit, the first information sub-block indicating whether the first bit block set is correctly received; a position of the first information sub-block in the P information sub-blocks is related to a position of the first time-frequency unit in the first time-frequency unit group.

In one subembodiment, among the P information sub-blocks only the first information sub-block is related to whether the first bit block set is correctly received.

In one subembodiment, time-frequency units in the first time-frequency unit group are sequentially arranged in a precedence order in time domain; the first time-frequency unit is an i-th time-frequency unit in the first time-frequency unit group, i being a positive integer no greater than P; the first information sub-block is an i-th information sub-block among the P information sub-blocks.

Embodiment 12

Embodiment 12 illustrates a schematic diagram of a second information block according to one embodiment of the present disclosure, as shown in FIG. 12. In Embodiment 12, a target signaling comprises a second field, the second field in the target signaling indicating a number of information bits comprised in the second information block.

In one embodiment, the target signaling is the first signaling.

In one embodiment, the target signaling is a latest signaling of the first signaling and the second signaling set.

In one embodiment, only a first information sub-block in the second information block is related to whether the first bit block set is correctly received, and the second field comprised in the target signaling indicates a position of the first information sub-block in the second information block.

In one embodiment, the second field comprises 2 bits.

In one embodiment, the second field comprises 4 bits.

In one embodiment, the second field is a Downlink assignment index field.

In one embodiment, the second field comprises all or partial information in a Downlink assignment index field.

Embodiment 13

Embodiment 13 illustrates a schematic diagram of a first time-frequency unit being used to determine a first radio resource block group according to one embodiment of the present disclosure; as shown in FIG. 13. In Embodiment 13, the first time-frequency unit group is a candidate time-frequency unit group of P4 candidate time-frequency unit groups, where P4 is a positive integer greater than 1; any of the P4 candidate time-frequency unit groups comprises a positive integer number of the time-frequency unit(s); the first radio resource block group is a candidate radio resource block group of P3 candidate radio resource block groups, where P3 is a positive integer greater than 1; any of the P4 candidate time-frequency unit groups corresponds to one of the P3 candidate radio resource block groups, the first radio resource block group being a candidate radio resource block group corresponding to the first time-frequency unit group among the P3 candidate radio resource block groups. In FIG. 13, indexes for the P3 candidate radio resource block groups are #0 ..., and #(P3−1), respectively, while indexes for the P4 candidate time-frequency unit groups are #0 ..., and #(P4−1), respectively.

In one embodiment, there is one candidate time-frequency unit group among the P4 candidate time-frequency unit groups that only comprises one said time-frequency unit.

In one embodiment, there is one candidate time-frequency unit group among the P4 candidate time-frequency unit groups that comprises multiple said time-frequency units.

In one embodiment, for any given candidate time-frequency unit group among the P4 candidate time-frequency unit groups, if the given candidate time-frequency unit group comprises multiple time-frequency units, the multiple time-frequency units are mutually orthogonal in time domain.

In one embodiment, the P4 candidate time-frequency unit groups are configured by a higher layer signaling.

In one embodiment, the P4 candidate time-frequency unit groups are configured by the first information block in the present disclosure.

In one embodiment, correspondence relationships between the P4 candidate time-frequency unit groups and the P3 candidate radio resource block groups are configured by a higher layer signaling.

In one embodiment, correspondence relationships between the P4 candidate time-frequency unit groups and the P3 candidate radio resource block groups are configured by the first information block in the present disclosure.

In one embodiment, any candidate radio resource block group of the P3 candidate radio resource block groups comprises a positive integer number of radio resource block(s), and any radio resource block in the P3 candidate radio resource block groups comprises a PSFCH resource.

In one embodiment, any time-frequency unit in the P4 candidate time-frequency unit groups belongs to a time unit in the first time unit set in time domain, while any one of the P3 candidate radio resource block groups belongs to the target time unit in time domain.

Embodiment 14

Embodiment 14 illustrates a schematic diagram of a first time-frequency unit being used to determine a first radio resource block group according to one embodiment of the present disclosure; as shown in FIG. 14. In Embodiment 14, the time units occupied by each of time-frequency units in the first time-frequency unit group constitute a first combination, the first combination being a candidate combination among P1 candidate combinations, P1 being a positive integer greater than 1, any of the P1 candidate combinations comprising a positive integer number of said time unit(s); a first sub-channel is a sub-channel occupied by the first time-frequency unit group; the first radio resource block group is a candidate radio resource block group among P3 candidate radio resource block groups, P3 being a positive integer greater than 1; the first combination and the first sub-channel are jointly used to determine the first radio resource block group from the P3 candidate radio resource block groups.

In one embodiment, there is one candidate combination among the P1 candidate combinations that only comprises 1 said time unit.

In one embodiment, there is one candidate combination among the P1 candidate combinations that comprises multiple said time units.

In one embodiment, for any given candidate combination among the P1 candidate combinations, if the given candidate combination comprises multiple time units, the multiple time units are mutually orthogonal in time domain.

In one embodiment, the P1 candidate combinations are configured by a higher layer signaling.

In one embodiment, the P1 candidate combinations are configured by the first information block in the present disclosure.

In one embodiment, any time unit in the P1 candidate combinations is a time unit in the first time unit set.

In one embodiment, the first sub-channel is a sub-channel occupied by an earliest time-frequency unit in the first time-frequency unit group.

In one embodiment, the first sub-channel is a lowest sub-channel occupied by an earliest time-frequency unit in the first time-frequency unit group.

In one embodiment, the first sub-channel is a starting sub-channel occupied by an earliest time-frequency unit in the first time-frequency unit group.

In one embodiment, any time unit in any one of the P1 candidate combinations is a time unit in the first time unit set, while any one of the P3 candidate radio resource block groups belongs to the target time unit in time domain.

In one embodiment, {the first combination, the first sub-channel}-pair is a candidate pair of P2 candidate pairs, P2 being a positive integer; any of the P2 candidate pairs comprises one candidate combination of the P1 candidate combinations and one sub-channel; any candidate pair among the P2 candidate pairs corresponds to a candidate radio resource block group of the P3 candidate radio resource block groups, the first radio resource block group being a candidate radio resource block group among the P3 candidate radio resource block groups corresponding to {the first combination, the first sub-channel}-pair.

In one subembodiment, correspondence relationships between the P2 candidate pairs and the P3 candidate radio resource block groups are configured by a higher layer signaling.

In one subembodiment, correspondence relationships between the P2 candidate pairs and the P3 candidate radio resource block groups are configured by the first information block in the present disclosure.

Embodiment 15

Embodiment 15 illustrates a schematic diagram illustrating K1 candidate time-frequency unit groups according to one embodiment of the present disclosure, as shown in FIG. 15. In Embodiment 15, the first time-frequency unit group is a candidate time-frequency unit group of the K1 candidate time-frequency unit groups; any candidate time-frequency unit group among the K1 candidate time-frequency unit groups comprises the first time-frequency unit. In FIG. 15, indexes for the K1 candidate time-frequency unit groups are #0 . . . , and #(K1−1), respectively.

In one embodiment, the first signaling explicitly indicates the first time-frequency unit group out of the K1 candidate time-frequency unit groups.

In one embodiment, the first signaling implicitly indicates the first time-frequency unit group out of the K1 candidate time-frequency unit groups.

In one embodiment, the first field in the first signaling indicates the first time-frequency unit group out of the K1 candidate time-frequency unit groups.

In one embodiment, any candidate time-frequency unit group among the K1 candidate time-frequency unit groups comprises a positive integer number of said time-frequency units.

In one embodiment, for any given candidate time-frequency unit group among the K1 candidate time-frequency unit groups, if the given candidate time-frequency unit group comprises multiple time-frequency units, the multiple time-frequency units are mutually orthogonal in time domain.

In one embodiment, any candidate time-frequency unit group among the K1 candidate time-frequency unit groups comprises at least one time-frequency unit orthogonal with the first time-frequency unit in time domain.

In one embodiment, there is one candidate time-frequency unit group among the K1 candidate time-frequency unit groups that only comprises the first time-frequency unit.

In one embodiment, a higher layer signaling is used to determine the K1 candidate time-frequency unit groups.

In one embodiment, the first information block in the present disclosure is used to determine the K1 candidate time-frequency unit groups.

In one embodiment, any time-frequency unit in the K1 candidate time-frequency unit groups belongs to a time unit in the first time unit set in time domain.

In one embodiment, a given time-frequency unit group is any candidate time-frequency unit group comprising multiple time-frequency units among the K1 candidate time-frequency unit groups; an interval between frequency-domain resources occupied by any two time-frequency units which are adjacent in time domain in the given time-frequency unit group is the first frequency-domain interval in Embodiment 9.

In one embodiment, a given time-frequency unit group is any candidate time-frequency unit group comprising multiple time-frequency units among the K1 candidate time-frequency unit groups; an interval between frequency-domain resources occupied by any two time-frequency units which are adjacent in time domain in the given time-frequency unit group is configured by a higher layer signaling.

In one embodiment, the K1 candidate time-frequency unit groups are composed of all candidate time-frequency unit groups among the K0 candidate time-frequency unit groups of which each comprises the first time-frequency unit, K0 being a positive integer greater than K1; any candidate time-frequency unit group of the K0 candidate time-frequency unit groups comprises a positive integer number of the time-frequency unit(s).

In one subembodiment, any candidate time-frequency unit comprised in the K0 candidate time-frequency unit groups belongs to a time unit in the first time unit set in time domain.

In one subembodiment, a higher layer signaling is used to determine the K0 candidate time-frequency unit groups.

In one subembodiment, the first information block is used to determine the K0 candidate time-frequency unit groups.

In one embodiment, a frequency-domain resource occupied by the first time-frequency unit is used to determine a frequency-domain resource occupied by each time-frequency unit in any one of the K1 candidate time-frequency unit groups.

In one embodiment, a starting subcarrier occupied by the first time-frequency unit is used to determine a starting subcarrier occupied by each time-frequency unit in any one of the K1 candidate time-frequency unit groups.

In one embodiment, the K1 candidate time-frequency unit groups respectively correspond to K1 candidate combinations, and any of the K1 candidate combinations is made up of the time units to which all time-frequency units in a corresponding candidate time-frequency unit group belong; any of the K1 candidate combinations is made up of all candidate combinations comprising the time unit to which the first time-frequency unit belongs among the K0 candidate combinations, where K0 is a positive integer greater than K1; any of the K0 candidate combinations comprises a positive integer number of the time unit(s).

In one subembodiment, any time unit comprised in the K0 candidate combinations is a time unit in the first time unit set.

In one subembodiment, the K0 candidate combinations are configured by a higher-layer signaling.

In one subembodiment, the K0 candidate combinations are configured by the first information block.

In one subembodiment, there is one candidate combination among the K1 candidate combinations that only comprises a time unit to which the first time-frequency unit belongs.

In one subembodiment, any candidate combination among the K1 candidate combinations comprises at least one time unit orthogonal with a time unit to which the first time-frequency unit belongs.

In one subembodiment, of any two candidate combinations among the K1 candidate combinations there is one candidate combination comprising a time unit that does not belong to the other candidate combination.

In one subembodiment, a first combination is a candidate combination corresponding to the first time-frequency unit group among the K1 candidate combinations, the first signaling indicating the first combination from the K1 candidate combinations.

In one subembodiment, a first combination is a candidate combination corresponding to the first time-frequency unit group among the K1 candidate combinations, the first field in the first signaling indicating the first combination from the K1 candidate combinations.

In one embodiment, the first signaling indicates a format of a physical layer channel bearing the second information block.

In one embodiment, the physical layer channel bearing the second information block is a PSFCH, the format of a physical layer channel bearing the second information block is a PSFCH format.

Embodiment 16

Embodiment 16 illustrates a schematic diagram illustrating a first time unit set and a target time unit according to one embodiment of the present disclosure, as shown in FIG. 16. In Embodiment 16, any time unit in the first time unit set is associated with the target time unit.

In one embodiment, a said time unit is a contiguous time period.

In one embodiment, a said time unit comprises a positive integer number of consecutive multicarrier symbols.

In one embodiment, a said time unit is a slot.

In one embodiment, a said time unit is a sub-frame.

In one embodiment, a said time unit is a sub-slot.

In one embodiment, a said time unit is a mini-slot.

In one embodiment, the first time unit set only comprises one said time unit.

In one embodiment, the first time unit set comprises multiple said time units.

In one embodiment, the first time unit set is made up of a positive integer number of said time units.

In one embodiment, a number of the time units comprised in the first time unit set is configured by a higher layer signaling.

In one embodiment, a number of the time units comprised in the first time unit set is configured by the first information block.

In one embodiment, the first time unit set and the target time unit are mutually orthogonal in time domain.

In one embodiment, a start time for the target time unit is no earlier than an end time for the first time unit set.

In one embodiment, the first radio resource block occupies partial time-domain resources in the target time unit in time domain.

In one embodiment, the first radio resource block occupies a positive integer number of latest multicarrier symbol(s) in the target time unit in time domain.

In one embodiment, the phrase that any time unit in the first time unit set is associated with the target time unit comprises: a HARQ-ACK corresponding to a PSSCH transmitted in any time unit in the first time unit set cannot be transmitted in time-domain resources other than the target time unit.

In one embodiment, the phrase that any time unit in the first time unit set is associated with the target time unit comprises: in the first time-frequency resource pool, a HARQ-ACK corresponding to a PSSCH transmitted in any time unit in the first time unit set cannot be transmitted in time-domain resources other than the target time unit In one embodiment, the phrase that any time unit in the first time unit set is associated with the target time unit comprises: a HARQ-ACK corresponding to a PSSCH transmitted in any time unit in the first time unit set is transmitted in the target time unit.

In one embodiment, the phrase that any time unit in the first time unit set is associated with the target time unit comprises: in the first time-frequency resource pool, a HARQ-ACK corresponding to a PSSCH transmitted in any time unit in the first time unit set is transmitted in the target time unit In one embodiment, the phrase that any time unit in the first time unit set is associated with the target time unit comprises: for any given time unit in the first time unit set, the target time unit is an earliest time unit in a first time unit pool of which a start time is no earlier than an end time for the given time unit, with a time interval between which and the given time unit being no smaller than a first time-domain interval; the first time unit pool comprises a positive integer number of said time units, any time unit in the first time unit pool comprising time-domain resources available for transmitting PSFCH; the first time-domain interval is a non-negative integer.

In one subembodiment, the first time unit pool is configured by a higher-layer signaling.

In one subembodiment, the first time unit pool is configured by the first information block.

In one subembodiment, the first time unit pool belongs to time-domain resources occupied by the first time-frequency resource pool.

In one subembodiment, the first information block indicates the first time unit pool from time-domain resources occupied by the first time-frequency resource pool.

In one subembodiment, the first time-domain interval is configured by a higher-layer signaling.

In one subembodiment, the first time-domain interval is configured by the first information block.

In one subembodiment, the first time-domain interval is a positive integer.

In one subembodiment, the first time-domain interval is measured in slots.

In one subembodiment, the first time-domain interval is measured in the time units.

In one subembodiment, the first time-domain interval is measured in a positive integer number of multicarrier symbol(s).

In one embodiment, the time interval between two time units refers to: a time interval between an end time for a time unit with an earlier start time of the two time units and a start time for the other time unit with a later start time of the two time units.

In one embodiment, the time interval between two time units refers to: a time interval between respective end times for the two time units.

In one embodiment, the time interval between two time units refers to: a time interval between respective start times for the two time units.

Embodiment 17

Embodiment 17 illustrates a schematic diagram illustrating a second time-frequency resource block group according to one embodiment of the present disclosure, as shown in FIG. 17. In Embodiment 17, the second time-frequency resource block group comprises a positive integer number of time-frequency resource block(s), any time-frequency resource block in the second time-frequency resource block group is overlapped with one and only one time-frequency unit in the first time-frequency unit group other than the first time-frequency unit.

In one embodiment, the overlapping includes being totally overlapping and partially overlapping.

In one embodiment, the overlapping includes being non-orthogonal.

In one embodiment, the second time-frequency resource block group and all time-frequency units in the first time-frequency unit group other than the first time-frequency unit are overlapping.

In one embodiment, the second time-frequency resource block group and partial time-frequency units in the first time-frequency unit group other than the first time-frequency unit are overlapping.

In one embodiment, different time-frequency resource blocks in the second time-frequency resource block group and different time-frequency units in the first time-frequency unit group are overlapping.

In one embodiment, there is a time-frequency resource block in the second time-frequency resource block group by which time-domain resources occupied are all time-domain resources in an overlapping time-frequency unit.

In one embodiment, any time-frequency resource block in the second time-frequency resource block group does not occupy time-frequency resources in any time-frequency unit in the first time-frequency unit group other than a corresponding time-frequency unit.

In one embodiment, any two time-frequency resource blocks in the second time-frequency resource block group are orthogonal in time domain.

In one embodiment, the first time-frequency unit group also comprises S2 time-frequency unit(s) apart from the first time-frequency unit, S2 being a positive integer; the second time-frequency resource block group comprises S3 time-frequency resource block(s), S3 being a positive integer no greater than S2; the S3 time-frequency resource block(s) and S3 time-frequency unit(s) of the S2 time-frequency unit(s) are overlapping.

In one subembodiment, S3 is less than S2.

In one subembodiment, S3 is equal to S2.

In one subembodiment, frequency-domain resources occupied by the S3 time-frequency units are respectively starting sub-channels occupied by the S3 time-frequency resource blocks.

In one subembodiment, time-domain resources occupied by the S3 time-frequency units are respectively time units to which the S3 time-frequency resource blocks respectively belong in time domain.

Embodiment 18

Embodiment 18 illustrates a schematic diagram illustrating a second time-frequency resource block group according to one embodiment of the present disclosure, as shown in FIG. 18. In Embodiment 18, there is a time-frequency resource block in the second time-frequency resource block group by which time-domain resources occupied are partial time-domain resources in an overlapping time-frequency unit.

In one embodiment, there is a time-frequency resource block in the second time-frequency resource block group which does not occupy a positive integer number of latest multicarrier symbol(s) in an overlapping time-frequency unit.

Embodiment 19

FIG. 19 illustrates a schematic diagram of a second signaling set and a second signal set according to one embodiment of the present disclosure, as shown in FIG. 19. In Embodiment 19, the second signaling set comprises W1 signalings, the second signal set comprises W1 signals, where W1 is a positive integer greater than 1; the W1 signalings respectively comprise scheduling information for the W1 signals. In FIG. 19, indexes for the W1 signalings and the W1 signals are #0 . . . , and #(W1−1), respectively.

In one embodiment, the second time-frequency resource block group comprises W1 time-frequency resource blocks, the W1 signalings are respectively transmitted in the W1 time-frequency resource blocks, and the W1 signals are respectively transmitted in the W1 time-frequency resource blocks; the W1 time-frequency resource blocks are mutually orthogonal in time domain.

In one embodiment, any signaling in the second signaling set is a dynamic signaling.

In one embodiment, any signaling in the second signaling set is a Layer1 (L1) signaling.

In one embodiment, any signaling in the second signaling set is a Layer1 (L1) control signaling.

In one embodiment, any signaling in the second signaling set comprises SCI.

In one embodiment, any signaling in the second signaling set comprises one or more fields in an SCI.

In one embodiment, any signaling in the second signaling set is transmitted in SideLink.

In one embodiment, any signaling in the second signaling set is transmitted via a PC5 interface.

In one embodiment, there is a signaling in the second signaling set being transmitted by Unicast.

In one embodiment, there is a signaling in the second signaling set being transmitted by Groupcast.

In one embodiment, there is a signaling in the second signaling set being transmitted by Broadcast.

In one embodiment, any signal in the second signal set is a radio signal.

In one embodiment, any signal in the second signal set is a baseband signal.

In one embodiment, any signal in the second signal set is transmitted in SideLink.

In one embodiment, any signal in the second signal set is transmitted via a PC5 interface.

In one embodiment, there is a signal in the second signal set being transmitted by Unicast.

In one embodiment, there is a signal in the second signal set being transmitted by Groupcast.

In one embodiment, there is a signal in the second signal set being transmitted by Broadcast.

In one embodiment, a target receiver for any signal in the second signal set includes the first node.

In one embodiment, there is a signal in the second signal set being earlier than the first signal in time domain.

In one embodiment, there is a signal in the second signal set being later than the first signal in time domain.

In one embodiment, a bit block set carried by any signal in the second signal set comprises a positive integer number of TB(s) or CBG(s).

In one embodiment, there is a signal in the second signal set being unrelated to the first bit block set.

In one embodiment, any signal in the second signal set carries a different bit block set from the first signal.

In one embodiment, there is a signal in the second signal set carrying a different bit block set from the first signal.

In one embodiment, there is a signal in the second signal set carrying the first bit block set.

In one embodiment, there is a signal in the second signal set corresponding to a different Cast Type from the first signal.

In one embodiment, the phrase that a transmitter for the second signal set is a transmitter for the first signal comprises: a transmitter for any signal in the second signal set is a transmitter for the first signal.

In one embodiment, an IDentity (ID) of any signal in the second signal set is the same as an ID of a transmitter for the first signal.

In one embodiment, a source ID of any signal in the second signal set is the same as a source ID of the first signal.

In one embodiment, a transmitter for any signal in the second signal set and a transmitter for the first signal are Quasi Co-Located (QCL).

In one embodiment, the specific definition of the QCL can be found in 3 GPP TS38.211, Section 4.4.

In one embodiment, the second information block indicates whether a bit block set carried by each signal in the second signal set is correctly received.

In one embodiment, the second information block respectively indicates whether a bit block set carried by each signal in the second signal set is correctly received.

In one embodiment, the second information block indicates whether each bit block in a bit block set carried by each signal in the second signal set is correctly received.

In one embodiment, the second information block respectively indicates whether each bit block in a bit block set carried by each signal in the second signal set is correctly received.

In one embodiment, for any given signal in the second signal set, the second information block indicates that each bit block in a bit block set carried by the given signal is correctly received, or that at least one bit block in the bit block set carried by the given signal is not correctly received.

In one embodiment, the first signaling and the second signaling set make up W2 signalings, while the first signal and the second signal set make up W2 signals, W2 being a positive integer greater than 1; an x-th signaling among the W2 signalings comprises scheduling information for an x-th signal among the W2 signals, where x is a positive integer no greater than W2.

In one subembodiment, a y-th signaling among the W2 signalings is used for reserving a time-frequency resource occupied by a (y+1)-th signal among the W2 signals; y is a positive integer less than W2.

In one subembodiment, a y-th signaling among the W2 signalings is used for reserving (a) time-frequency resource(s) occupied by signal(s) later than a y-th signal among the W2 signals; y is a positive integer less than W2.

Embodiment 20

FIG. 20 illustrates a schematic diagram of a second signaling set and a second signal set according to one embodiment of the present disclosure, as shown in FIG. 20. In Embodiment 20, the second signaling set only comprises one signaling, the second signal set comprises only one signal; the signaling comprises scheduling information for the said signal.

Embodiment 21

Embodiment 21 illustrates a schematic diagram of a reference first-type signaling according to one embodiment of the present disclosure, as shown in FIG. 21. In Embodiment 21, a data channel scheduled by the reference first-type signaling is used to determine a reference time-frequency unit, the first field in the reference first-type signaling indicates whether a radio resource occupied by a second-type channel corresponding to the reference first-type signaling is related to at least one time-frequency unit other than the reference time-frequency unit.

In one embodiment, the data channel scheduled by the reference first-type signaling is used by a target receiver for the data channel for determining the reference time-frequency unit.

In one embodiment, the data channel scheduled by the reference first-type signaling is used by a transmitter for the data channel for determining the reference time-frequency unit.

In one embodiment, the first-type signaling is a dynamic signaling.

In one embodiment, the first-type signaling is a layer 1 (L1) signaling.

In one embodiment, the first-type signaling is a layer 1 (L1) control signaling.

In one embodiment, the first-type signaling comprises SCI.

In one embodiment, a said first-type signaling comprises one or more fields in an SCI.

In one embodiment, the first-type signaling is transmitted on a PSCCH.

In one embodiment, the first field comprises all or partial information in one or more fields in an SCI.

In one embodiment, the first field comprises a positive integer number of bit(s).

In one embodiment, the first field in the reference first-type signal indicates whether a HARQ-ACK corresponding to the data channel scheduled by the reference first-type channel is transmitted.

In one embodiment, the data channel scheduled by the reference first-type signaling is a PSSCH.

In one embodiment, the second-type channel is a sidelink physical layer feedback channel (i.e., a sidelink channel only capable of bearing a physical layer HARQ feedback).

In one embodiment, the second-type channel is a PSFCH.

In one embodiment, the second-type channel corresponding to the reference first-type signaling is used for transmitting a HARQ-ACK corresponding to the data channel scheduled by the reference first-type signaling.

In one embodiment, a frequency-domain resource and a time-domain resource comprised by the data channel scheduled by the reference first-type signaling are respectively used to determine a frequency-domain resource and a time-domain resource of the reference time-frequency unit.

In one embodiment, a frequency-domain resource occupied by the reference time-frequency unit is a starting sub-channel occupied by the data channel scheduled by the reference first-type signaling.

In one embodiment, a time-domain resource occupied by the reference time-frequency unit is the time unit to which a time-domain resource occupied by the data channel scheduled by the reference first-type signaling belongs.

In one embodiment, the data channel scheduled by the reference first-type signaling is used for determining that a method for the reference time-frequency unit is similar to a way in which the first time-frequency resource block is used to determine the first time-frequency unit.

In one embodiment, the first field in the reference first-type signaling indicates whether a radio resource occupied by the second-type channel corresponding to the reference first-type signaling is related to at least one time-frequency unit which is orthogonal within the reference time-frequency unit in time domain.

In one embodiment, the first field in the reference first-type signaling indicates that a radio resource occupied by the second-type channel corresponding to the reference first-type signaling is unrelated to any time-frequency unit other than the reference time-frequency unit.

In one embodiment, the first field in the reference first-type signaling indicates that a radio resource occupied by the second-type channel corresponding to the reference first-type signaling is related to at least one time-frequency unit which is orthogonal within the reference time-frequency unit in time domain.

In one embodiment, the second-type channel corresponding to the reference first-type signaling is a reference second-type channel; the first field in the reference first-type signaling indicates a format of the reference second-type channel.

In one subembodiment, the format of the reference second-type channel is a PSFCH format.

In one subembodiment, the first field in the reference first-type signaling indicates the format of the reference second-type channel from a first format and a second format.

In one reference embodiment of the above subembodiment, when the first field in the reference first-type signaling indicates that a radio resource occupied by the reference second-type channel is unrelated to any time-frequency unit other than the reference time-frequency unit, the format of the reference second-type channel is the first format; when the first field in the reference first-type signaling indicates that a radio resource occupied by the reference second-type channel is related to at least one time-frequency unit other than the reference time-frequency unit, the format of the reference second-type channel is the second format.

In one reference embodiment of the above subembodiment, when the format of the reference second-type channel is the first format, a number of information bits carried by the reference second-type channel is a first numerical value; when the format of the reference second-type channel is the second format, a number of information bits carried by the reference second-type channel is a second numerical value; the first numerical value and the second numerical value are respectively positive integers, the first numerical value being unequal to the second numerical value.

In one reference embodiment of the above subembodiment, when the format of the reference second-type channel is the first format, a number of REs occupied by the reference second-type channel is a third numerical value; when the format of the reference second-type channel is the second format, a number of REs occupied by the reference second-type channel is a fourth numerical value; the third numerical value and the fourth numerical value are respectively positive integers, the third numerical value being unequal to the fourth numerical value.

In one embodiment, the first field in the first signaling indicates that the first radio resource group is related to at least one time-frequency unit orthogonal with the first time-frequency unit in time domain.

Embodiment 22

Embodiment 22 illustrates a schematic diagram of a first information block according to one embodiment of the present disclosure, as shown in FIG. 22. In Embodiment 22, the first information block indicates the first time-frequency resource pool.

In one embodiment, the first information block is carried by a higher layer signaling.

In one embodiment, the first information block is carried by an RRC signaling.

In one embodiment, the first information block is carried by a Medium Access Control layer Control Element (MAC CE) signaling.

In one embodiment, the first information block is transmitted in SideLink.

In one embodiment, the first information block is transmitted via a PC5 interface.

In one embodiment, the first information block is transmitted in DownLink.

In one embodiment, the first information block is transmitted via a Uu interface.

In one subembodiment, the first information block comprises information in all or partial fields in an Information Element (IE).

In one subembodiment, the first information block comprises information in one or more fields in a Master Information Block (MIB).

In one subembodiment, the first information block comprises information in one or more fields in a System Information Block (SIB).

In one subembodiment, the first information block comprises information in one or more fields in Remaining System Information (RMSI).

In one embodiment, the first information block is transmitted through a radio signal.

In one embodiment, the first information block is transmitted from a transmitter for the first signal to the first node.

In one embodiment, the first information block is transmitted from a serving cell for the first node to the first node.

In one embodiment, the first information block is delivered from an upper layer of the first node to a physical layer of the first node.

In one embodiment, the first information block is delivered from a higher layer of the first node to a physical layer of the first node.

In one embodiment, the first information block explicitly indicates the first time-frequency resource pool.

In one embodiment, the first information block implicitly indicates the first time-frequency resource pool.

In one embodiment, the first time-frequency resource pool is comprised of a positive integer number of RE(s).

In one embodiment, the first time-frequency resource pool comprises a positive integer number of subcarrier(s) in frequency domain.

In one embodiment, the first time-frequency resource pool comprises a positive integer number of PRB(s) in frequency domain.

In one embodiment, the first time-frequency resource pool comprises a positive integer number of sub-channel(s) in frequency domain.

In one embodiment, the first time-frequency resource pool comprises a positive integer number of multicarrier symbol(s) in time domain.

In one embodiment, the first time-frequency resource pool comprises a positive integer number of slot(s) in time domain.

In one embodiment, the first time-frequency resource pool comprises a positive integer number of sub-frame(s) in time domain.

In one embodiment, the first time-frequency resource pool comprises a positive integer number of said time unit(s) in time domain.

In one embodiment, the first time-frequency resource pool occurs multiple times in time domain.

In one embodiment, the first time-frequency resource pool occurs only once in time domain.

In one embodiment, time-frequency resources in the first time-frequency resource pool are reserved for a V2X transmission.

In one embodiment, time-frequency resources in the first time-frequency resource pool are reserved for a sidelink.

In one embodiment, the first time-frequency unit group belongs to the first time-frequency resource pool.

In one embodiment, the first radio resource block group belongs to the first time-frequency resource pool in time-frequency domain.

In one embodiment, each of the K1 candidate time-frequency unit groups belongs to the first time-frequency resource pool.

In one embodiment, each of the Q1 candidate time-frequency unit groups in Embodiment 1 belongs to the first time-frequency resource pool.

In one embodiment, the second time-frequency resource block group belongs to the first time-frequency resource pool.

In one embodiment, the P3 candidate radio resource block groups in Embodiment 13 and Embodiment 14 belong to the first time-frequency resource pool in time-frequency domain.

Embodiment 23

Embodiment 23 illustrates a structure block diagram of a processing device used in a first node according to one embodiment of the present disclosure; as shown in FIG. 23. In FIG. 23, a processing device 2300 in a first node is comprised of a first receiver 2301 and a first transmitter 2302.

In Embodiment 23, the first receiver 2301 receives a first signaling and a first signal in a first time-frequency resource block; and the first transmitter 2302 transmits a second information block in a first radio resource block.

In Embodiment 23, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first time-frequency unit group is a candidate time-frequency unit group of K1 candidate time-frequency unit groups, K1 being a positive integer greater than 1, any candidate time-frequency unit group among the K1 candidate time-frequency unit groups comprises the first time-frequency unit.

In one embodiment, the first signaling indicates the first time-frequency unit group out of the K1 candidate time-frequency unit groups.

In one embodiment, any time-frequency unit in the first time-frequency unit group belongs to a time unit in a first time unit set in time domain, the first time unit set comprises a positive integer number of time unit(s); the first radio resource block group belongs to a target time unit in time domain; any time unit in the first time unit set is associated with the target time unit.

In one embodiment, the first receiver 2301 receives a second signaling set and a second signal set in a second time-frequency resource block group; wherein the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

In one embodiment, the first signaling is a first-type signaling, the first-type signaling comprising a first field; a reference first-type signaling is any said first-type signaling, and a data channel scheduled by the reference first-type signaling is used to determine a reference time-frequency unit, the first field in the reference first-type signaling indicates whether a radio resource occupied by a second-type channel corresponding to the reference first-type signaling is related to at least one time-frequency unit other than the reference time-frequency unit.

In one embodiment, the first receiver 2301 receives a first information block; herein, the first information block indicates a first time-frequency resource pool, the first time-frequency resource block belonging to the first time-frequency resource pool.

In one embodiment, the first node is a UE.

In one embodiment, the first node is a relay node.

In one embodiment, the first receiver 2301 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 2302 comprises at least one of the antenna 452, the transmitter 454, the transmitting processor 468, the multi-antenna transmitting processor 457, the controller/processor 459, the memory 460 or the data source 467 in Embodiment 4.

Embodiment 24

Figure 24:
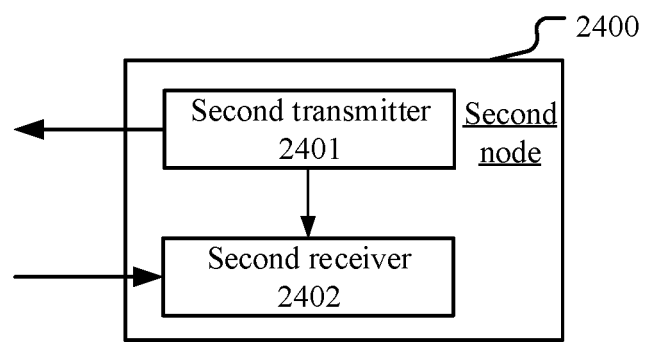
FIG. 24 illustrates a structure block diagram of a processing device used in a second node according to one embodiment of the present disclosure.

Embodiment 24 illustrates a structure block diagram of a processing device used in a second node according to one embodiment of the present disclosure; as shown in FIG. 24. In FIG. 24, a processing device 2400 in a second node is comprised of a second transmitter 2401 and a second receiver 2402.

In Embodiment 24, the second transmitter 2401 transmits a first signaling and a first signal in a first time-frequency resource block; and the second receiver 2402 receives a second information block in a first radio resource block.

In Embodiment 24, the first signaling comprises scheduling information for the first signal; the first signal carries a first bit block set; the second information block indicates whether the first bit block set is correctly received; the first radio resource block is a radio resource block in a first radio resource block group; the first time-frequency resource block is used to determine a first time-frequency unit; a first time-frequency unit group comprises the first time-frequency unit and at least one time-frequency unit other than the first time-frequency unit, any two time-frequency units in the first time-frequency unit group are orthogonal in time domain; the first time-frequency unit group is used to determine the first radio resource block group.

In one embodiment, the first time-frequency unit group is a candidate time-frequency unit group of K1 candidate time-frequency unit groups, K1 being a positive integer greater than 1, any candidate time-frequency unit group among the K1 candidate time-frequency unit groups comprises the first time-frequency unit.

In one embodiment, the first signaling indicates the first time-frequency unit group out of the K1 candidate time-frequency unit groups.

In one embodiment, any time-frequency unit in the first time-frequency unit group belongs to a time unit in a first time unit set in time domain, the first time unit set comprises a positive integer number of time unit(s); the first radio resource block group belongs to a target time unit in time domain; any time unit in the first time unit set is associated with the target time unit.

In one embodiment, the second transmitter 2401 transmits a second signaling set and a second signal set in a second time-frequency resource block group; wherein the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

In one embodiment, the first signaling is a first-type signaling, the first-type signaling comprising a first field; a reference first-type signaling is any said first-type signaling, and a data channel scheduled by the reference first-type signaling is used to determine a reference time-frequency unit, the first field in the reference first-type signaling indicates whether a radio resource occupied by a second-type channel corresponding to the reference first-type signaling is related to at least one time-frequency unit other than the reference time-frequency unit.

In one embodiment, the second transmitter 2401 transmits a first information block; herein, the first information block indicates a first time-frequency resource pool, the first time-frequency resource block belonging to the first time-frequency resource pool.

In one embodiment, the second node is a UE.

In one embodiment, the second node is a relay node.

In one embodiment, the second transmitter 2401 comprises at least one of the antenna 420, the transmitter 418, the transmitting processor 416, the multi-antenna transmitting processor 471, the controller/processor 475 or the memory 476 in Embodiment 4.

In one embodiment, the second receiver 2402 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (JOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving a first signaling and a first signal in a first time-frequency resource block; and
a first transmitter, transmitting a second information block in a first radio resource block;
wherein the first signaling comprises scheduling information for the first signal; the first signaling and the first signal belong to a same slot in a time domain; the first signal carries a first bit block set; the second information block indicates whether the first bit block set is correctly received; the first radio resource block is a radio resource block in a first radio resource block group; the first time-frequency resource block comprises a first time-frequency unit; a first time-frequency unit group comprises the first time-frequency unit and at least one time-frequency unit other than the first time-frequency unit, any two time-frequency units in the first time-frequency unit group are orthogonal in the time domain; each time-frequency unit comprises a slot in the time domain; the first signal does not occupy time-frequency resources within any time-frequency unit in the first time-frequency unit group other than the first time-frequency unit; the first time-frequency unit group is used to determine the first radio resource block group; the first time-frequency unit group is a candidate time-frequency unit group of P4 candidate time-frequency unit groups, where P4 is a positive integer greater than 1; any of the P4 candidate time-frequency unit groups comprises a positive integer number of the time-frequency unit(s); the first radio resource block group is a candidate radio resource block group of P3 candidate radio resource block groups, where P3 is a positive integer greater than 1; any of the P4 candidate time-frequency unit groups corresponds to one of the P3 candidate radio resource block groups, the first radio resource block group being a candidate radio resource block group corresponding to the first time-frequency unit group among the P3 candidate radio resource block groups; correspondence relationships between the P4 candidate time-frequency unit groups and the P3 candidate radio resource block groups are configured by a higher layer signaling, wherein (i) the first time-frequency unit group is a candidate time-frequency unit group of K1 candidate time-frequency unit groups, K1 being a positive integer greater than 1; any candidate time-frequency unit group among the K1 candidate time-frequency unit groups comprises the first time-frequency unit, or (ii) the first time-frequency unit group is a candidate time-frequency unit group of Q1 candidate time-frequency unit groups, Q1 being a positive integer greater than 1, only the first time-frequency unit group among the Q1 candidate time-frequency unit groups comprises the first time-frequency unit; the Q1 candidate time-frequency unit groups are determined by the higher-layer signaling.

2. The first node according to claim 1, wherein the first signaling indicates the first time-frequency unit group out of the K1 candidate time-frequency unit groups.

3. The first node according to claim 1, wherein the first receiver receives a second signaling set and a second signal set in a second time-frequency resource block group; wherein the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

4. The first node according to claim 1, wherein the first radio resource block group comprises multiple radio resource blocks, a target receiver for the first signal is a first node set, the first node set comprises a positive integer number of node(s), and the first node set comprises the first node; an index for the first node in the first node set is used to determine the first radio resource block in the first radio resource block group.

5. The first node according to claim 1, wherein the first receiver receives a first information block; herein, the first information block indicates a first time-frequency resource pool, the first time-frequency resource block belonging to the first time-frequency resource pool.

6. A second node for wireless communications, comprising:
a second transmitter, transmitting a first signaling and a first signal in a first time-frequency resource block; and
a second receiver, receiving a second information block in a first radio resource block;
wherein the first signaling comprises scheduling information for the first signal; the first signaling and the first signal belong to a same slot in a time domain; the first signal carries a first bit block set; the second information block indicates whether the first bit block set is correctly received; the first radio resource block is a radio resource block in a first radio resource block group; the first time-frequency resource block comprises a first time-frequency unit; a first time-frequency unit group comprises the first time-frequency unit and at least one time-frequency unit other than the first time-frequency unit, any two time-frequency units in the first time-frequency unit group are orthogonal in the time domain; each time-frequency unit comprises a slot in the time domain; the first signal does not occupy time-frequency resources within any time-frequency unit in the first time-frequency unit group other than the first time-frequency unit; the first time-frequency unit group is used to determine the first radio resource block group; the first time-frequency unit group is a candidate time-frequency unit group of P4 candidate time-frequency unit groups, where P4 is a positive integer greater than 1; any of the P4 candidate time-frequency unit groups comprises a positive integer number of the time-frequency unit(s); the first radio resource block group is a candidate radio resource block group of P3 candidate radio resource block groups, where P3 is a positive integer greater than 1; any of the P4 candidate time-frequency unit groups corresponds to one of the P3 candidate radio resource block groups, the first radio resource block group being a candidate radio resource block group corresponding to the first time-frequency unit group among the P3 candidate radio resource block groups; correspondence relationships between the P4 candidate time-frequency unit groups and the P3 candidate radio resource block groups are configured by a higher layer signaling, wherein (i) the first time-frequency unit group is a candidate time-frequency unit group of K1 candidate time-frequency unit groups, K1 being a positive integer greater than 1; any candidate time-frequency unit group among the K1 candidate time-frequency unit groups comprises the first time-frequency unit, or (ii) the first time-frequency unit group is a candidate time-frequency unit group of Q1 candidate time-frequency unit groups, Q1 being a positive integer greater than 1, only the first time-frequency unit group among the Q1 candidate time-frequency unit groups comprises the first time-frequency unit; the Q1 candidate time-frequency unit groups are determined by the higher-layer signaling.

7. The second node according to claim 6, wherein the first signaling indicates the first time-frequency unit group out of the K1 candidate time-frequency unit groups.

8. The second node according to claim 6, wherein the second transmitter transmits a second signaling set and a second signal set in a second time-frequency resource block group; wherein the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

9. The second node according to claim 6, wherein the first radio resource block group comprises multiple radio resource blocks, a target receiver for the first signal is a first node set, the first node set comprises a positive integer number of node(s), and the first node set comprises a transmitter of the second information block; an index for the transmitter of the second information block in the first node set is used to determine the first radio resource block in the first radio resource block group.

10. The second node according to claim 6, wherein the second transmitter transmits a first information block; herein, the first information block indicates a first time-frequency resource pool, the first time-frequency resource block belonging to the first time-frequency resource pool.

11. A method in a first node for wireless communications, comprising:
receiving a first signaling and a first signal in a first time-frequency resource block; and
transmitting a second information block in a first radio resource block;
wherein the first signaling comprises scheduling information for the first signal; the first signaling and the first signal belong to a same slot in a time domain; the first signal carries a first bit block set; the second information block indicates whether the first bit block set is correctly received; the first radio resource block is a radio resource block in a first radio resource block group; the first time-frequency resource block comprises a first time-frequency unit; a first time-frequency unit group comprises the first time-frequency unit and at least one time-frequency unit other than the first time-frequency unit, any two time-frequency units in the first time-frequency unit group are orthogonal in the time domain; each time-frequency unit comprises a slot in time domain; the first signal does not occupy time-frequency resources within any time-frequency unit in the first time-frequency unit group other than the first time-frequency unit; the first time-frequency unit group is used to determine the first radio resource block group; the first time-frequency unit group is a candidate time-frequency unit group of P4 candidate time-frequency unit groups, where P4 is a positive integer greater than 1; any of the P4 candidate time-frequency unit groups comprises a positive integer number of the time-frequency unit(s); the first radio resource block group is a candidate radio resource block group of P3 candidate radio resource block groups, where P3 is a positive integer greater than 1; any of the P4 candidate time-frequency unit groups corresponds to one of the P3 candidate radio resource block groups, the first radio resource block group being a candidate radio resource block group corresponding to the first time-frequency unit group among the P3 candidate radio resource block groups; correspondence relationships between the P4 candidate time-frequency unit groups and the P3 candidate radio resource block groups are configured by a higher layer signaling, wherein (i) the first time-frequency unit group is a candidate time-frequency unit group of K1 candidate time-frequency unit groups, K1 being a positive integer greater than 1, any candidate time-frequency unit group among the K1 candidate time-frequency unit groups comprises the first time-frequency unit, or (ii) the first time-frequency unit group is a candidate time-frequency unit group of Q1 candidate time-frequency unit groups, Q1 being a positive integer greater than 1, only the first time-frequency unit group among the Q1 candidate time-frequency unit groups comprises the first time-frequency unit; the Q1 candidate time-frequency unit groups are determined by the higher-layer signaling.

12. The method according to claim 11, wherein
the first signaling indicates the first time-frequency unit group from the K1 candidate time-frequency unit groups.

13. The method according to claim 11, comprising:
receiving a second signaling set and a second signal set in a second time-frequency resource block group;
wherein the second signaling set comprises scheduling information for the second signal set, a transmitter for the second signal set is a transmitter for the first signal; the second information block indicates whether a bit block set carried by the second signal set is correctly received; the second time-frequency resource block group is overlapping with a positive integer number of the time-frequency unit(s) in the first time-frequency unit group other than the first time-frequency unit.

14. The method according to claim 11, wherein the first radio resource block group comprises multiple radio resource blocks, a target receiver for the first signal is a first node set, the first node set comprises a positive integer number of node(s), and the first node set comprises the first node; an index for the first node in the first node set is used to determine the first radio resource block in the first radio resource block group.

15. The method according to claim 11, comprising:
receiving a first information block;
wherein, the first information block indicates a first time-frequency resource pool, the first time-frequency resource block belonging to the first time-frequency resource pool.

* * * * *